(12) United States Patent
VandenBerg

(10) Patent No.: US 10,600,542 B2
(45) Date of Patent: Mar. 24, 2020

(54) POLARITY-SWITCHING MAGNET DIODE

(71) Applicant: Chad Ashley VandenBerg, Vancouver, WA (US)

(72) Inventor: Chad Ashley VandenBerg, Vancouver, WA (US)

(*) Notice: Subject to any disclaimer, the term of this patent is extended or adjusted under 35 U.S.C. 154(b) by 500 days.

(21) Appl. No.: 15/391,106

(22) Filed: Dec. 27, 2016

(65) Prior Publication Data
US 2018/0182523 A1    Jun. 28, 2018

(51) Int. Cl.
| H01F 7/20 | (2006.01) |
| H01F 7/06 | (2006.01) |
| H01F 7/02 | (2006.01) |
| H01F 27/28 | (2006.01) |
| H01F 27/40 | (2006.01) |
| H02K 1/14 | (2006.01) |
| H02K 1/24 | (2006.01) |

(52) U.S. Cl.
CPC ............. *H01F 7/06* (2013.01); *H01F 7/0226* (2013.01); *H01F 7/20* (2013.01); *H01F 27/28* (2013.01); *H01F 27/40* (2013.01); *H02K 1/146* (2013.01); *H02K 1/24* (2013.01)

(58) Field of Classification Search
CPC . H01F 27/28; H01F 27/40; H01F 7/06; H01F 7/0226; H01F 7/20; H02K 1/146; H02K 1/24
USPC .......................................... 335/299, 302–306
See application file for complete search history.

(56) References Cited

U.S. PATENT DOCUMENTS

| 3,146,381 | A | 8/1964 | Moreau |
| 3,879,622 | A | 4/1975 | Ecklin |
| 4,806,834 | A | 2/1989 | Koenig |
| 5,382,853 | A | 1/1995 | von der Heide et al. |
| 6,342,746 | B1 | 1/2002 | Flynn |
| 6,518,681 | B2 | 2/2003 | Ogino |
| 6,700,230 | B1 | 3/2004 | Gokturk |
| 7,247,962 | B2 | 7/2007 | Burgbacher |
| 7,453,341 | B1 | 11/2008 | Hildenbrand |
| 9,240,267 | B2 | 1/2016 | Nagahara et al. |
| 2002/0175578 | A1 | 11/2002 | McMullen et al. |
| 2002/0175580 | A1 | 11/2002 | Ogino |
| 2010/0089711 | A1 | 4/2010 | Nehl et al. |
| 2014/0339927 | A1 | 11/2014 | Flynn |
| 2016/0164394 | A1 | 6/2016 | Knaian et al. |

FOREIGN PATENT DOCUMENTS

| CN | 101320615 A | 12/2008 |
| WO | 2016/178473 A1 | 11/2016 |

*Primary Examiner* — Bernard Rojas
(74) *Attorney, Agent, or Firm* — Fish IP Law, LLP

(57) ABSTRACT

A polarity-switching magnetic diode provides a method of gating or "rectifying" N and S polarized flux contained within the closed-loop flux circuit of a magnetic flux element. Gaps separate the opposing magnetic polarities, and strategically placed control coils are disposed to break the magnetic circuit in at least two places upon electrical activation of the device—forming high density flux zones of opposite polarity. Switching the control coil's magnetic flux flow allows for the high density flux zones to alternate N and S polarity.

9 Claims, 18 Drawing Sheets

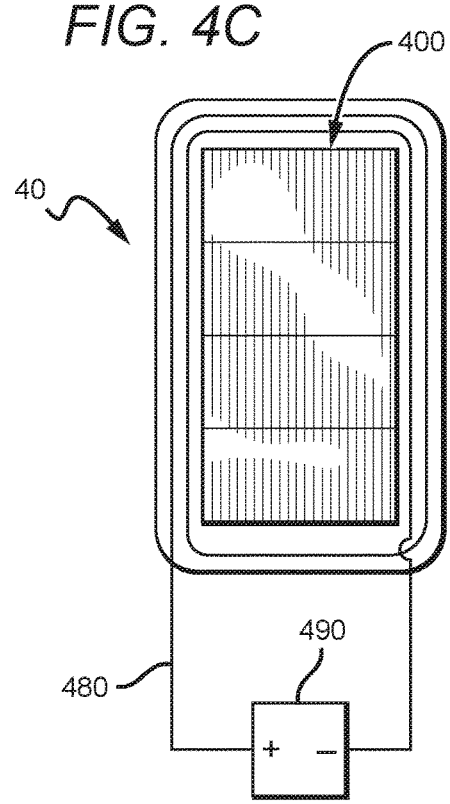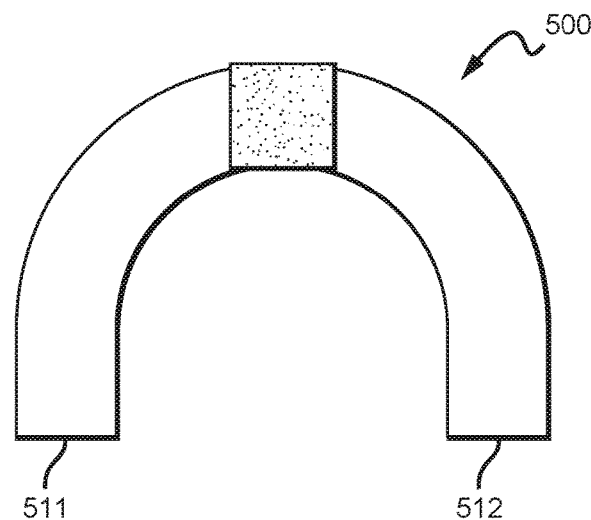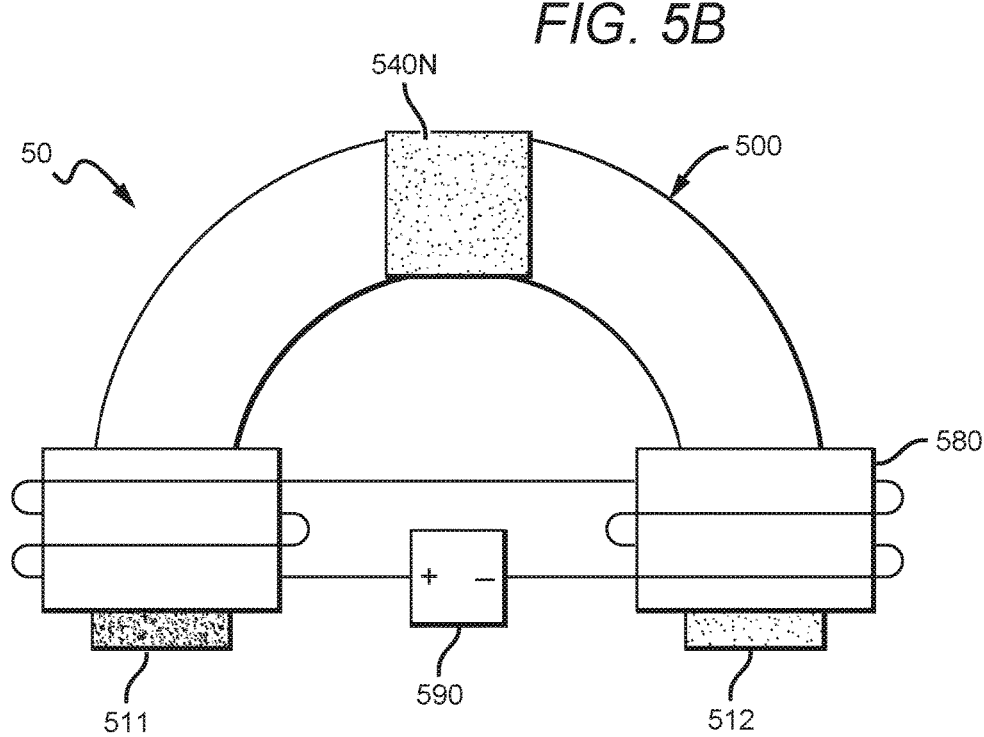

POLARITY-SWITCHING MAGNET DIODE

FIELD OF THE INVENTION

The field of the invention is electromagnetic devices, namely a polarity-switching electromagnet and motors incorporating the same.

BACKGROUND

The background description includes information that may be useful in understanding the present invention. It is not an admission that any of the information provided herein is prior art or relevant to the presently claimed invention, or that any publication specifically or implicitly referenced is prior art.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Magnetic fields and electromagnetic circuits can be used to change electrical energy into mechanical energy and vice-versa. The most versatile magnetic motors activate and deactivate magnetic fields in various ways.

U.S. Pat. No. 6,342,746 to Flynn teaches various permanent magnet devices magnetically coupled with pole pieces to provide multiple parallel magnetic flux paths. Control coils are positioned along flux paths and are energized in a variety of on/off programs to achieve desirable motive and static devices by manipulating flux paths within the pole pieces. However, Flynn's system merely activates and deactivates flux paths in parts of the pole pieces, which prevents full utilization of Flynn's pole pieces when a flux path is deactivated.

U.S. Pat. No. 6,518,681 to Ogino teaches a motor that improves energy efficiency by arranging permanent magnet elements on both sides of an electromagnet element through contact surfaces, such that the working surfaces and the contact surfaces are held opposite to each other through the permanent magnet element. Such a configuration allows the electromagnet element to shift the working surfaces from a first state where the permanent magnet's magnetic line of force goes round along a closed magnetic path of the electromagnet element to a second state where the permanent magnet's magnetic line of force is discharged into the air, allowing the magnetic flux force to affect an attraction member from a distance. Ogino's motor, however, only affects attraction members in one state, effectively turning it into an "on-off" device, which fails to utilize the attractive force of the permanent magnet when the motor is in its "off" state.

U.S. Pat. No. 7,453,341 to Hildenbrand teaches a valve comprising both a permanent magnet and an electromagnet comprising a bore and a coil. Hildenbrand's valve aligns the poles of the permanent magnet and the electromagnet to create a combined magnetic field on a load when the electromagnet is turned on, and the magnetic field returns to its original magnetic flux path away from the load and through the electromagnet bore when the electromagnet is turned off. While Hildenbrand combines the magnetic fields of both the permanent magnet and the electromagnet into a single force, Hildenbrand's effective pole can only act upon a load when the electromagnet is turned on, which would normally be only 50% of the time when used in an electromagnetic rotor.

Thus, there remains a need for a system and method that fully utilizes the flux energy from permanent magnets and electromagnetic devices in all states.

SUMMARY OF THE INVENTION

The inventive subject matter provides apparatuses in which a polarity-switching magnetic diode includes a first magnetic north flux donor and a first magnetic south flux donor, both magnetically coupled to a magnetic flux element. The magnetic flux element comprises a first effective pole, a second effective pole, and a first gap. A control coil is wrapped around a portion of the magnetic flux element and preferably at least partially around the gap. As used herein, a "magnetic flux element" comprises a magnetic or magnetizable material having a lower reluctance to magnetic flux than air.

The control coil has a first active magnetic state and a second active magnetic state. In the first active magnetic state, the control coil directs north magnetic flux from the first magnetic north flux donor along the magnetic flux element towards the first effective pole and directs south magnetic flux from the first magnetic south flux donor along the magnetic flux element towards the second effective pole. In the second active magnetic state, the control coil directs north magnetic flux from the first magnetic north flux donor along the magnetic flux element towards the second effective pole and directs south magnetic flux from the first magnetic south flux donor along the magnetic flux element towards the first effective pole. The magnetic north and magnetic south flux donors (e.g., permanent magnets) donate magnetic flux to both the first and second effective poles, increasing the magnetic field density to a level higher than achievable from the amp turns of the control coil alone. It should be appreciated that switching the control coil between the first and second active magnetic states reverses the polarity of the first and second effective poles. The amount of flux needed to be created by the control coils in order to completely control the flux provided by one or more permanent magnet flux donors is typically equal to the flux provided by the flux donor themselves.

As used herein, a "control coil" comprises a conductive material wrapped around a magnetic flux element in such a way that, when current flows through the conductive material, electromagnetic flux is generated within the magnetic flux element. A control coil may comprise a single wire of conductive material wrapped around one or more portions of the magnetic flux element, two or more wires of conductive material wrapped around one or more portions of the magnetic flux element coupled to a common power source, or two or more wires of conductive material wrapped around one or more portions of the magnetic flux element coupled to several power sources that are synchronized with one another.

The configuration of the north and south flux donors can be varied in numerous ways. In one embodiment, a permanent magnet comprises the first magnetic north flux donor and the first magnetic south flux donor. In another embodiment, a first permanent magnet comprises the first magnetic north flux donor, and a second permanent magnet comprises the first magnetic south flux donor. When two or more permanent magnets are employed in the polarity-switching magnetic diode the magnetic axis of the first permanent magnet is preferably substantially parallel to a magnetic axis of the second permanent magnet. In this embodiment, the magnetic axes of the first and second permanent magnets may or may not pass through the control coil bore.

In another exemplary aspect of the inventive subject matter, a second magnetic north flux donor is magnetically coupled to the magnetic flux element, and a second magnetic south flux donor is magnetically coupled to the magnetic flux element. Contemplated magnetic flux elements are substantially straight or substantially curved. The first active magnetic state also directs north magnetic flux from the second magnetic north flux donor to the first effective pole, and directs south magnetic flux from the second magnetic south flux donor to the second effective pole. Therefore, in the first active magnetic state, the magnetic flux from both the first and second north flux donors is directed toward the first effective pole, and the magnetic flux from both the first and second south magnetic flux donors is directed toward the second effective pole.

The magnetic flux element could also comprise a plurality of parallel layers separated by gaps. One or more of the gaps can include a permanent magnet that donates north and south flux to the first and second effective poles, depending on whether the control coil is in the first or second effective magnetic state. Advantageously, each magnetic flux donor (e.g., each permanent magnet) donates flux to the first or second effective pole in both the first and second active magnetic states. In other words, north magnetic flux from the north magnetic flux donor(s) is directed to the first effective pole, and when the polarity is switched, north magnetic flux from the north magnetic flux donor(s) is directed to the second effective pole.

Multiple permanent magnets could provide multiple north and south flux donors. For example, a first permanent magnet comprises the first magnetic north flux donor and the first magnetic south flux donor, and a second permanent magnet comprises the second magnetic north flux donor and the second magnetic south flux donor. A magnetic axis of the first permanent magnet is substantially parallel to a magnetic axis of the second permanent magnet, and the magnetic axes of the first and second permanent magnets pass through the control coil bore. The magnetic flux element preferably comprises a second gap that extends at least partially into the control coil. When no current is flowing through the control coil, the first and second gaps ensure that north and south flux complete the magnetic circuit inside the bore of a control coil. When current flows through the control coil, this configuration results in full rectification of the north and south magnetic fluxes, and thus, selective expression of either a north or south polarity at either effective pole face.

In some embodiments, the control coil is positioned proximate to at least one of the first effective pole and the second effective pole. As used herein the term "proximate" to an effective pole means within 1 cm of the effective pole. Preferably, at least a portion of the gap extends into at least a portion of the control coil. Additionally, or alternatively, the control coil wraps around the magnetic flux element along a magnetic flux path between the first magnetic north donor and at least one of the first and second effective poles.

Polarity-switching may be a accomplished using any known switching methodologies employed in, for example, electronic or motor applications to effect a reversal of the current passing through the control coil in order to flip the control coil from the first active magnetic state to the second active magnetic state.

Polarity-switching magnetic diodes can be incorporated into motors in which a magnetic north flux donor is magnetically coupled to a magnetic flux element, and a magnetic south flux donor is magnetically coupled to the magnetic flux element. The magnetic flux element typically comprises at least a first effective pole and a second effective pole that switch when the current through a control coil switches, although more effective poles could be used, for example 4, 6, or even 8.

In an embodiment with four effective poles (a first, second, third, and fourth), a control coil wrapped around a portion of the magnetic flux element could have a first active magnetic state and a second active magnetic state which direct magnetic flux from magnetic flux donors to different effective poles. For example, the first active magnetic state could direct north magnetic flux from the magnetic north flux donor along the magnetic flux element towards the second effective pole and directs south magnetic flux from the magnetic south flux donor along the magnetic flux element towards the third effective pole. The second active magnetic state directs north magnetic flux from the magnetic north flux donor along the magnetic flux element towards the first effective pole and directs south magnetic flux from the magnetic flux element along the bidirectional flux path towards the second effective pole.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 4C shows a side view of the polarity-switching magnetic diode of FIG. 4B.

FIG. 5A is a schematic representation of a curved magnetic flux element, wherein the first magnetic north flux donor and the first magnetic south flux donor are in a gap in the magnetic flux element, and the magnetic flux element is sandwiched between the second magnetic north flux donor and the second magnetic south flux donor.

FIG. 5B shows a polarity-switching magnetic diode having the elements of FIG. 5A and a control coil in the first active magnetic state.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1A:
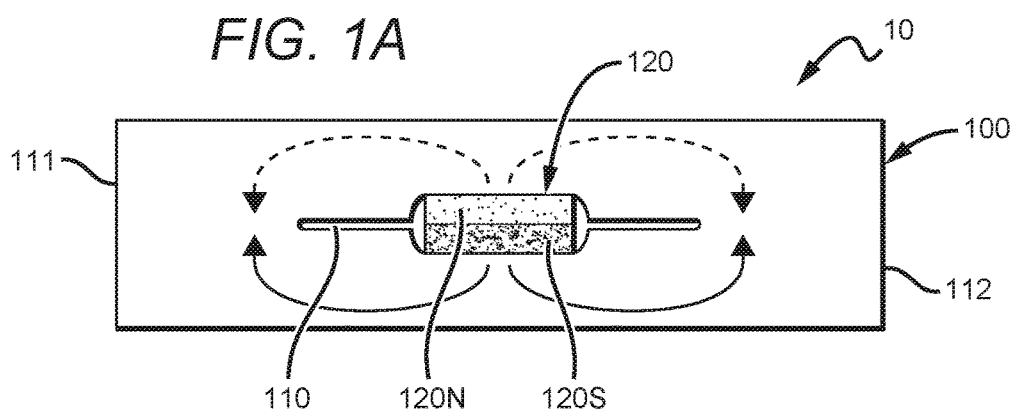
FIG. 1A is a schematic representation of a magnetic flux element, wherein the first magnetic north flux donor and the first magnetic south flux donor are in a gap in the magnetic flux element.
Figure 1B:
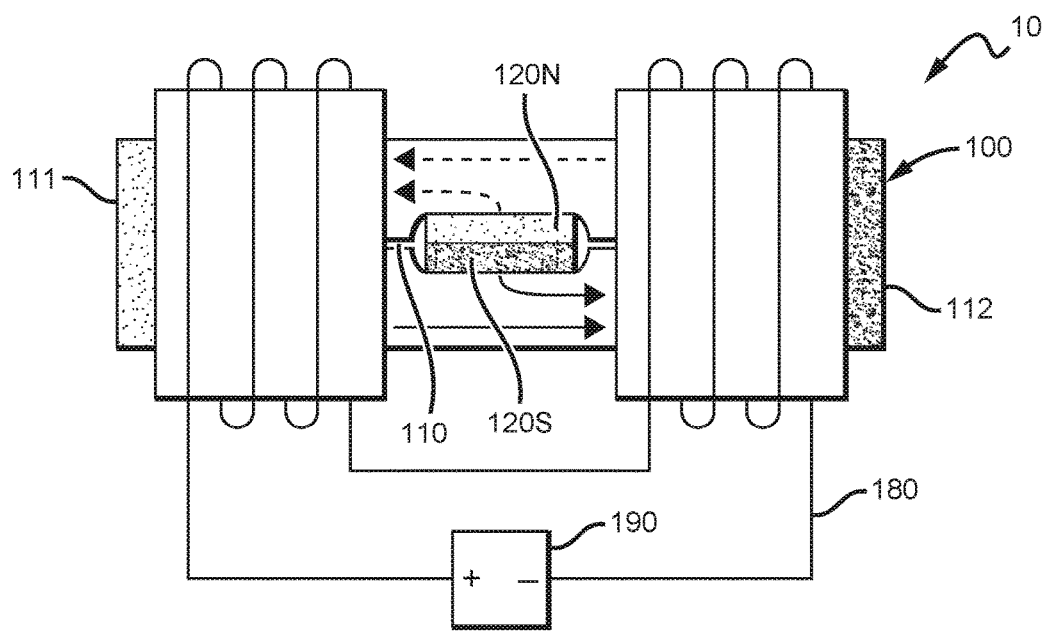
FIG. 1B shows a polarity-switching magnetic diode having the elements of FIG. 1A and a control coil in the first active magnetic state.
Figure 1C:
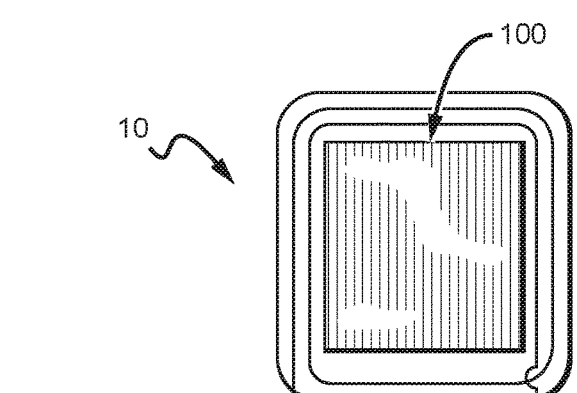
FIG. 1C shows a side view of the polarity-switching magnetic diode of FIG. 1B.

Polarity-switching magnetic diode 10 is shown in FIGS. 1A-C. FIG. 1A shows magnetic flux element 100 and a permanent magnet 120, without a control coil. Magnetic flux element 100 has a first effective pole 111, a second effective pole 112, and a gap 110. Permanent magnet 120 has a first magnetic north flux donor 120N and a first magnetic south flux donor 120S. First magnetic north flux donor 120N and first magnetic south flux donor 120S are magnetically coupled to magnetic flux element 100 within two inner-surfaces of gap 110.

Magnetic flux element 100 could comprise any suitable infrastructure to conduct magnetic flux, such as monolithic and laminate magnetic flux elements. Exemplary laminations are visible in FIG. 1C. In embodiments with laminate magnetic flux elements, the orientation of the laminations is preferably parallel to the plane of the gap. Because the reluctance between each layer and reluctance of the gap are greater than the reluctance of the material within each layer, magnetic flux typically flows within each layer from the north and south flux donors towards the first and second effective poles, completing a magnetic circuit. The arrows in FIG. 1A illustrate magnetic flux in such a magnetic circuit without a control coil.

Magnetic flux elements can be made of any suitable material, particularly ferrous materials, including iron and iron alloys (e.g., steel, magnetite, and alloys comprising iron, nickel, cobalt, and/or neodymium). In some applications, it may be desirable to use non-ferrous, magnetizable materials, for example, cobalt, nickel, manganese-bismuth, manganese-antimony, and samarium-cobalt alloys. In electromagnetic lifts, motors, and traction type machines, magnetic flux elements preferably comprise soft iron, high performance iron cobalt alloys, or grain oriented electrical steel.

As shown in FIG. 1B, gap 110 preferably extends at least partially into control coil 180. While some embodiments may function without gap 110 not extending into control coil 180, the gap extending into control coil 180 makes it easier to cut the N and S flux off from each other. One of the two flux paths on each side of FIG. 1A are cut off as coil 180 accepts/pulls and is reinforced by one flux polarity and the magnetic force needed to be induced by control coil adds to the magnetic force at the opposite effective pole. Control coil 180 has a first active magnetic state and a second active magnetic state. FIG. 1B illustrates the magnetic field in the first active magnetic state. The magnetic field created by control coil 180 redirects the magnetic flux from the first magnetic north flux donor 120N along magnetic flux element 100 towards the first effective pole 111 and magnetic flux from the first magnetic south flux donor 120S along magnetic flux element 100 towards the second effective pole 112.

Switching the polarity of the current (e.g., using switch 190) switches control coil 180 to the second active magnetic state. The second active magnetic state directs north magnetic flux from first magnetic north flux donor 120N along magnetic flux element 100 towards second effective pole 112 and directs south magnetic flux from the first magnetic south flux donor 120S along magnetic flux element 100 towards first effective pole 111. Advantageously, both the first and second effective poles can adopt either north or south magnetic polarities, and in both active magnetic states, the full flux of north flux donor 120N and south flux donor 120S is applied to at least one of the first effective pole 111 and second effective pole 112, respectively.

Figure 2A:
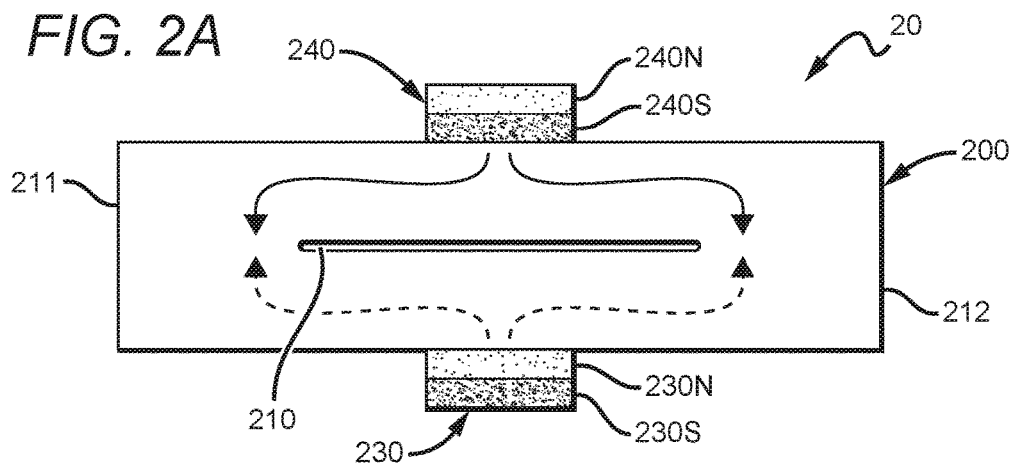
FIG. 2A is a schematic representation of a magnetic flux element having a gap, wherein the magnetic flux element is sandwiched between the first magnetic north flux donor and the first magnetic south flux donor.
Figure 2B:
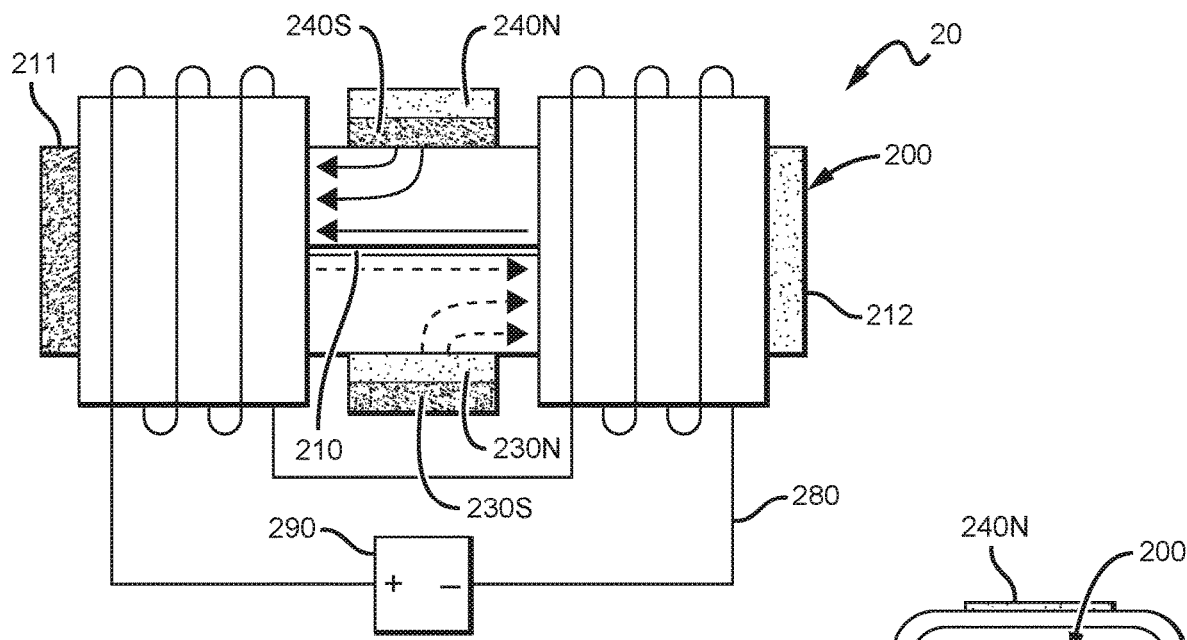
FIG. 2B shows a polarity-switching magnetic diode having the elements of FIG. 2A and a control coil in the first active magnetic state.
Figure 2C:
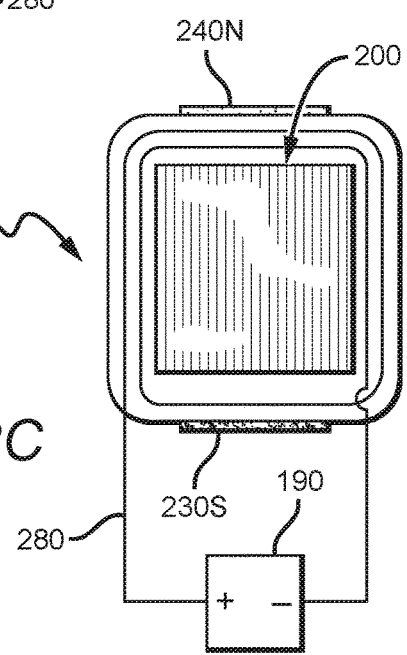
FIG. 2C shows a side view of the polarity-switching magnetic diode of FIG. 2B.

FIGS. 2A-C shows an alternative polarity-switching magnetic diode in which permanent magnets 230 and 240 are magnetically coupled to bottom and top surfaces of magnetic flux element 200, respectively. Permanent magnet 230 serves as first magnetic north flux donor 230N, and permanent magnet 240 serves as first magnetic south flux donor 240S. When control coil 280 (not shown in FIG. 2A) is off, magnetic flux flows from first magnetic north flux donor 230N along magnetic flux element 200, around gap 210, completing the magnetic circuit at first magnetic south flux donor 240S as indicated by the arrows.

FIG. 2B illustrates the polarity-switching magnetic diode when control coil 280 is in the second active magnetic state. The second active magnetic state directs north magnetic flux from first magnetic north flux donor 230N along magnetic flux element 200 towards second effective pole 212 and directs south magnetic flux from the first magnetic south flux donor 240S along magnetic flux element 200 towards first effective pole 211.

A side view of polarity-switching magnetic diode 20 is shown in FIG. 2C. Magnetic north pole 240N of permanent magnet 240 is visible above control coil 280, and magnetic south pole 230S of permanent magnet 230 is visible below control coil 280. FIG. 2C also shows the layers of laminated magnetic flux element 200.

Figure 3A:
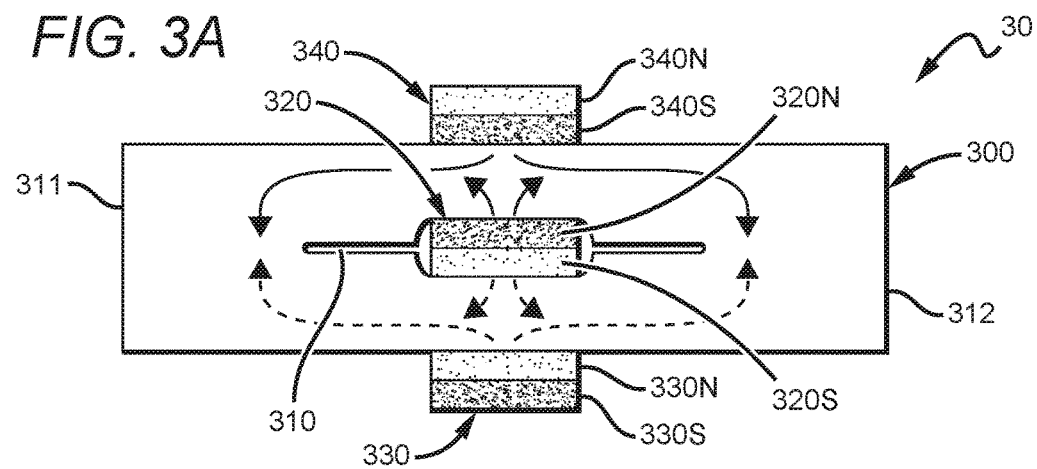
FIG. 3A is a schematic representation of a magnetic flux element, wherein the first magnetic north flux donor and the first magnetic south flux donor are in a gap in the magnetic flux element, and the magnetic flux element is sandwiched between the second magnetic north flux donor and the second magnetic south flux donor.
Figure 3B:
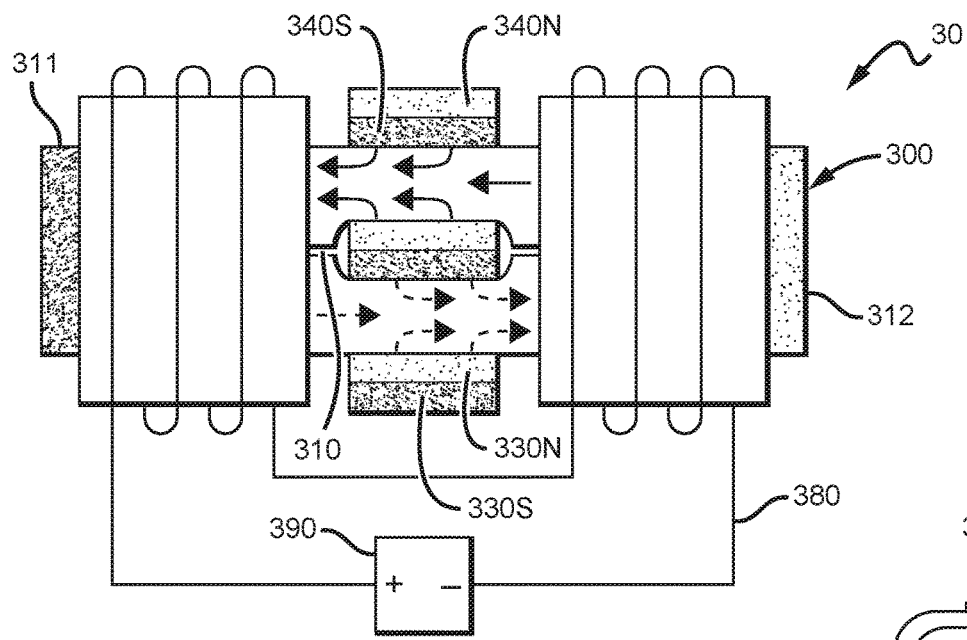
FIG. 3B shows a polarity-switching magnetic diode having the elements of FIG. 3A and a control coil in the first active magnetic state.
Figure 3C:
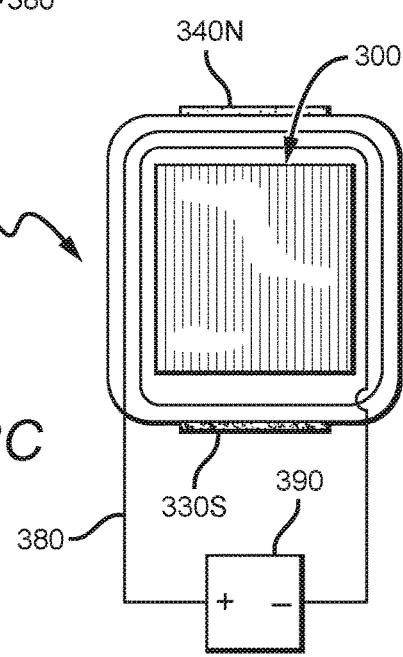
FIG. 3C shows a side view of the polarity-switching magnetic diode of FIG. 3B.

Polarity-switching magnetic diode 30, as shown in FIGS. 3A-C, employs permanent magnets 320, 330, and 340. Permanent magnet 320 has first magnetic north flux donor 320N and first magnetic south flux donor 320S. The magnetic north pole of permanent magnet 330 serves as second magnetic north flux donor 330N, which is magnetically coupled to the bottom of magnetic flux element 300. The magnetic south pole of permanent magnet 340 serves as second magnetic south flux donor 340S, which is magnetically coupled the top of magnetic flux element 300.

Figure 4A:
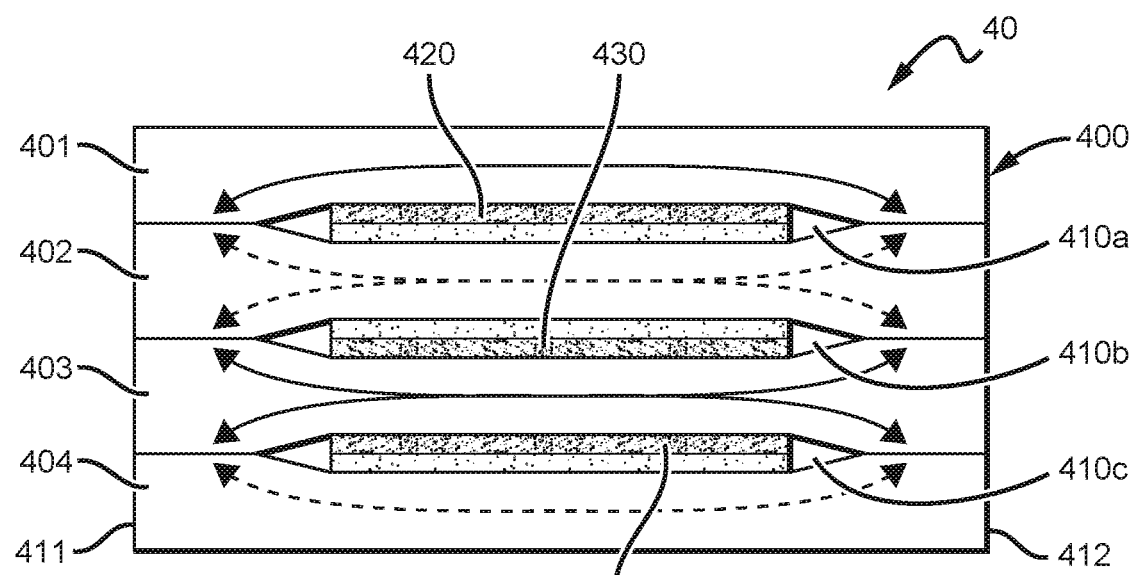
FIG. 4A is a schematic representation of a magnetic flux element, wherein the first magnetic north flux donor and the first magnetic south flux donor are in a gap in the magnetic flux element, wherein the second magnetic north flux donor and the second magnetic south flux donor are in another gap in the magnetic flux element, and wherein the third magnetic north flux donor and the third magnetic south flux donor are in yet another gap in the magnetic flux element.
Figure 4B:
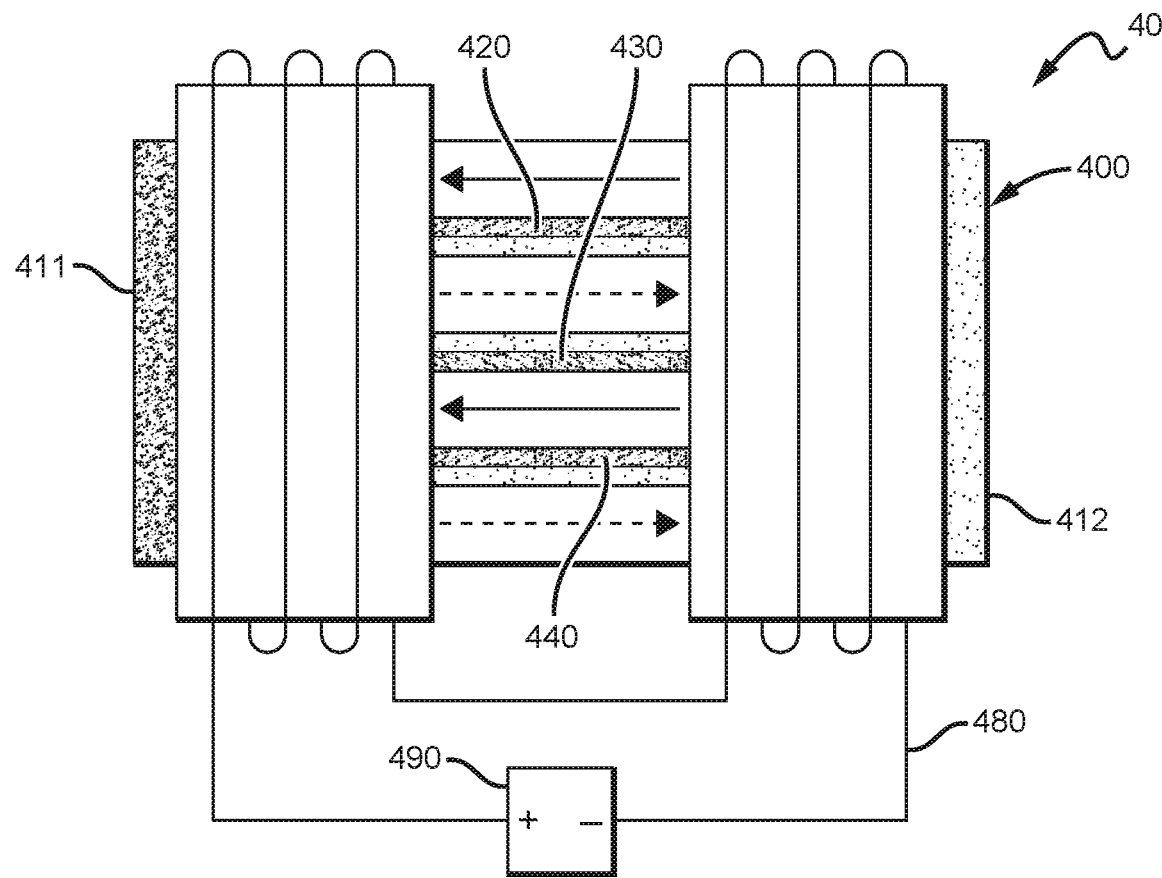
FIG. 4B shows a polarity-switching magnetic diode having the elements of FIG. 4A and a control coil in the first active magnetic state.

Yet another polarity-switching magnetic diode 40 is illustrated in FIGS. 4A-C. In addition to having laminations running from top to bottom as shown in FIG. 4C, magnetic flux element 400 further has horizontal layers 401, 402, 403, and 404. Permanent magnets 420, 430, and 440 are disposed in gaps 410a-c. Magnetic north flux donors 420N, 430N, and 440N are magnetically coupled to magnetic flux element 400. Magnetic south flux donors 420S, 430S, and 440S are magnetically coupled to magnetic flux element 400. Magnetic north flux donors 420N and 430N face each other and are separated by layer 402 of magnetic flux element 400. Magnetic south flux donors 430S and 440S face each other and are separated by layer 403 of magnetic flux element 400. When no current passes through control coil 380, the magnetic circuit is completed as indicated by the arrows.

FIG. 4B shows polarity-switching magnetic diode 40 when control coil 480 is in the second active magnetic state. Second effective pole 412 exhibits magnetic north polarity, and first effective pole 411 exhibits magnetic south polarity.

Figure 5C:
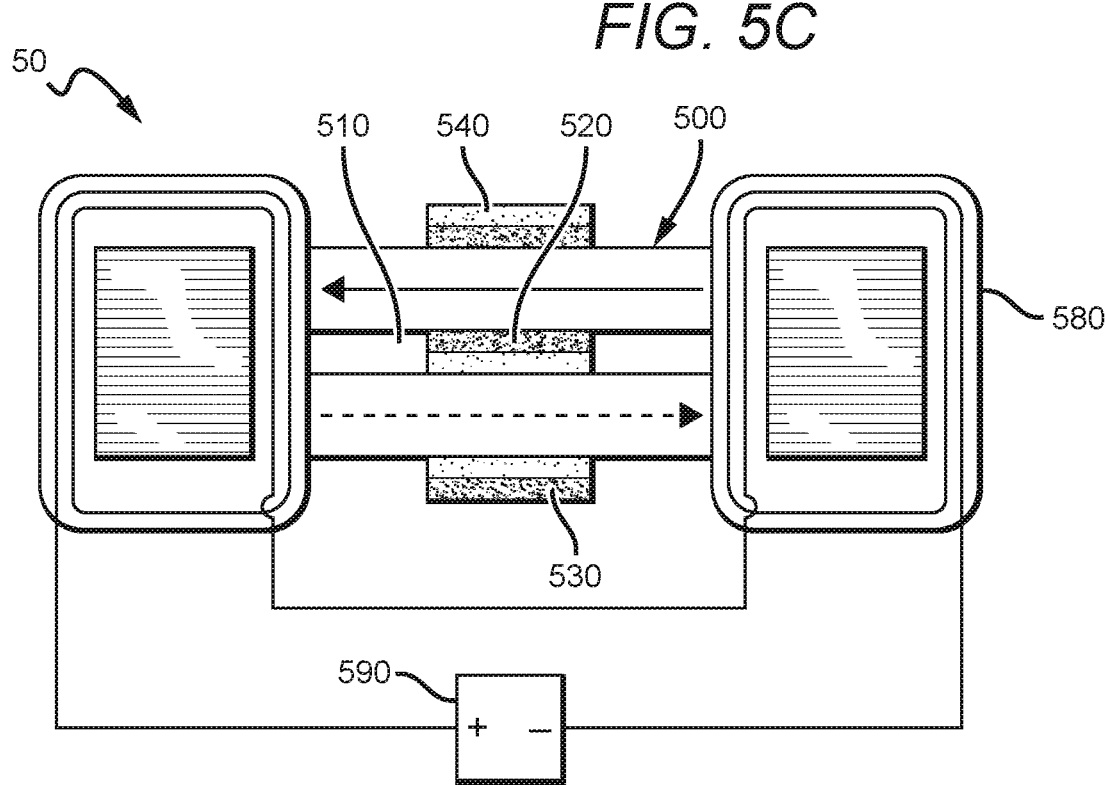
FIG. 5C shows a side view of the polarity-switching magnetic diode of FIG. 5B.

FIGS. 5A-C show an embodiment of a polarity-switching magnetic diode having curved magnetic flux element 500. FIG. 5A is a top view of magnetic flux element 500 and the magnetic north face of permanent magnet 540, without control coil 580. In this embodiment, magnetic flux element 500 comprises layers that are parallel to gap 510, which extends into control coil 580. Permanent magnet 520 is disposed in gap 510 of flux element 500, as shown in FIG. 5C. Magnetic north flux donor 510N is magnetically coupled to the magnetic flux element at the bottom of gap 510, and magnetic south flux donor 520S is magnetically coupled to magnetic flux element at the top of gap 510. Magnetic north flux donor 530N is magnetically coupled to the bottom of magnetic flux element 500, and magnetic south flux donor 540S is magnetically coupled to the top of magnetic flux element 500. In FIGS. 5B & C, control coil 580 is in the second active magnetic state, and magnetic north flux donors 520N and 530N both donate north magnetic flux to the second effective pole 512. South magnetic flux donors 520S and 540S donate south magnetic flux to first effective pole 511. The polarity of the voltage is switched using switch 590.

Figure 6A:
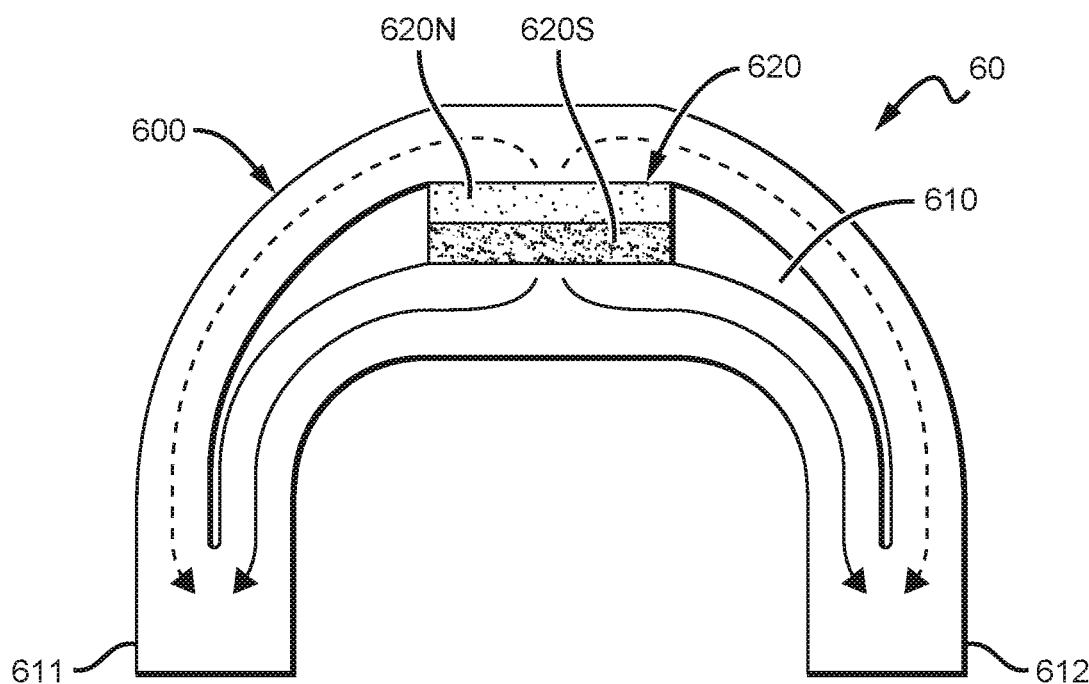
FIG. 6A is a schematic representation of a curved magnetic flux element, wherein the first magnetic north flux donor and the first magnetic south flux donor are in a gap in the magnetic flux element.
Figure 6B:
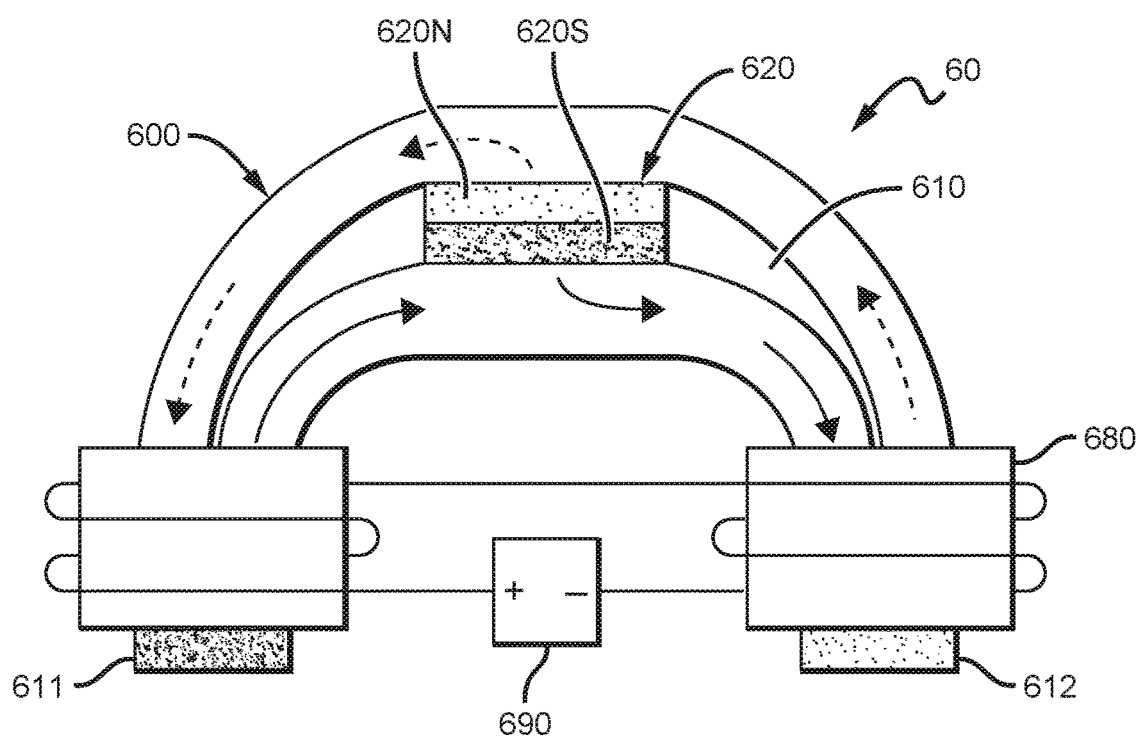
FIG. 6B shows a polarity-switching magnetic diode having the elements of FIG. 6A and a control coil in the first active magnetic state.
Figure 6C:
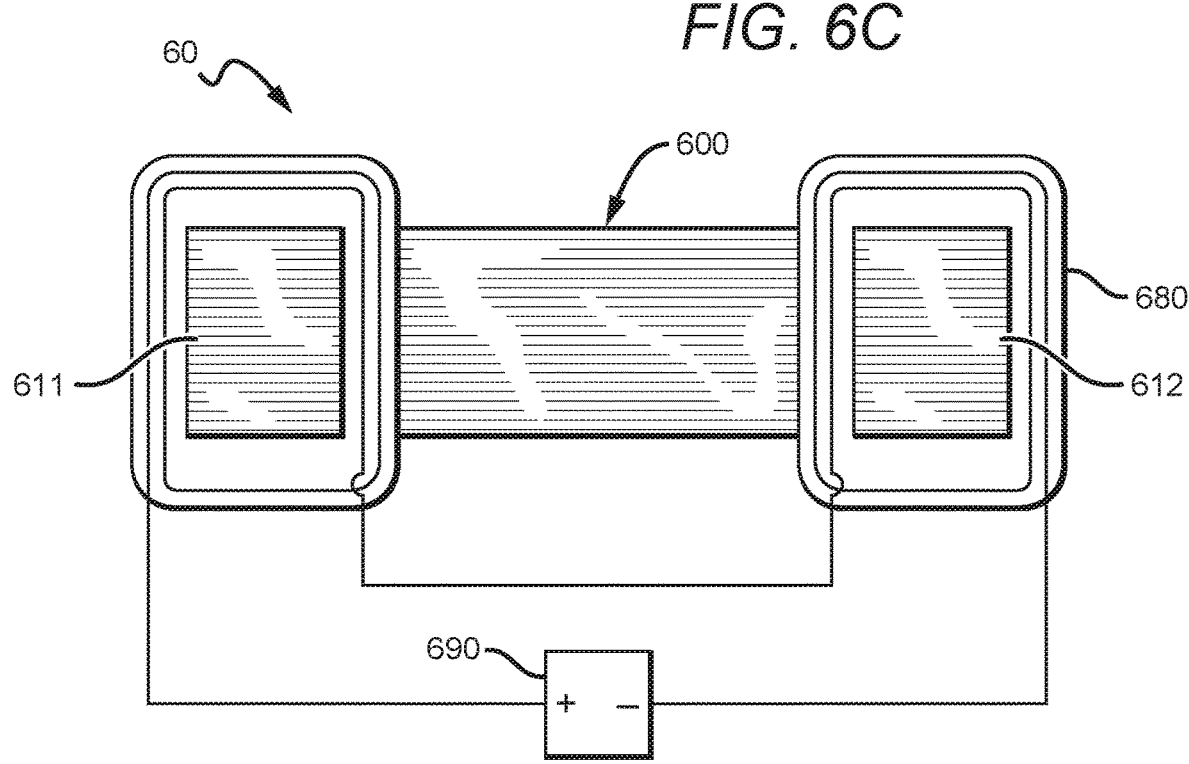
FIG. 6C shows a side view of the polarity-switching magnetic diode of FIG. 6B.

FIG. 6A shows magnetic flux element 600, which has gap 610 and permanent magnet 620. Permanent magnet 620 is disposed in gap 610 such that magnetic north flux donor 620N and magnetic south flux donor 620S are in magnetic contact with magnetic flux element 600. FIG. 6B shows polarity-switching magnetic diode 60 with control coil 680 in the first active magnetic state. Magnetic north flux is directed from magnetic north flux donor 520N to first effective pole 611. Magnetic south flux is directed from magnetic south flux donor 520S to second effective pole 612. In FIG. 6C, control coil 680 is in the second active magnetic state. The face of first effective pole 611 exhibits magnetic north polarity, and the face of second effective pole 612 exhibits magnetic south polarity. The layers or laminations that make-up magnetic flux element 600 are visible in FIG. 6C.

Figure 7:
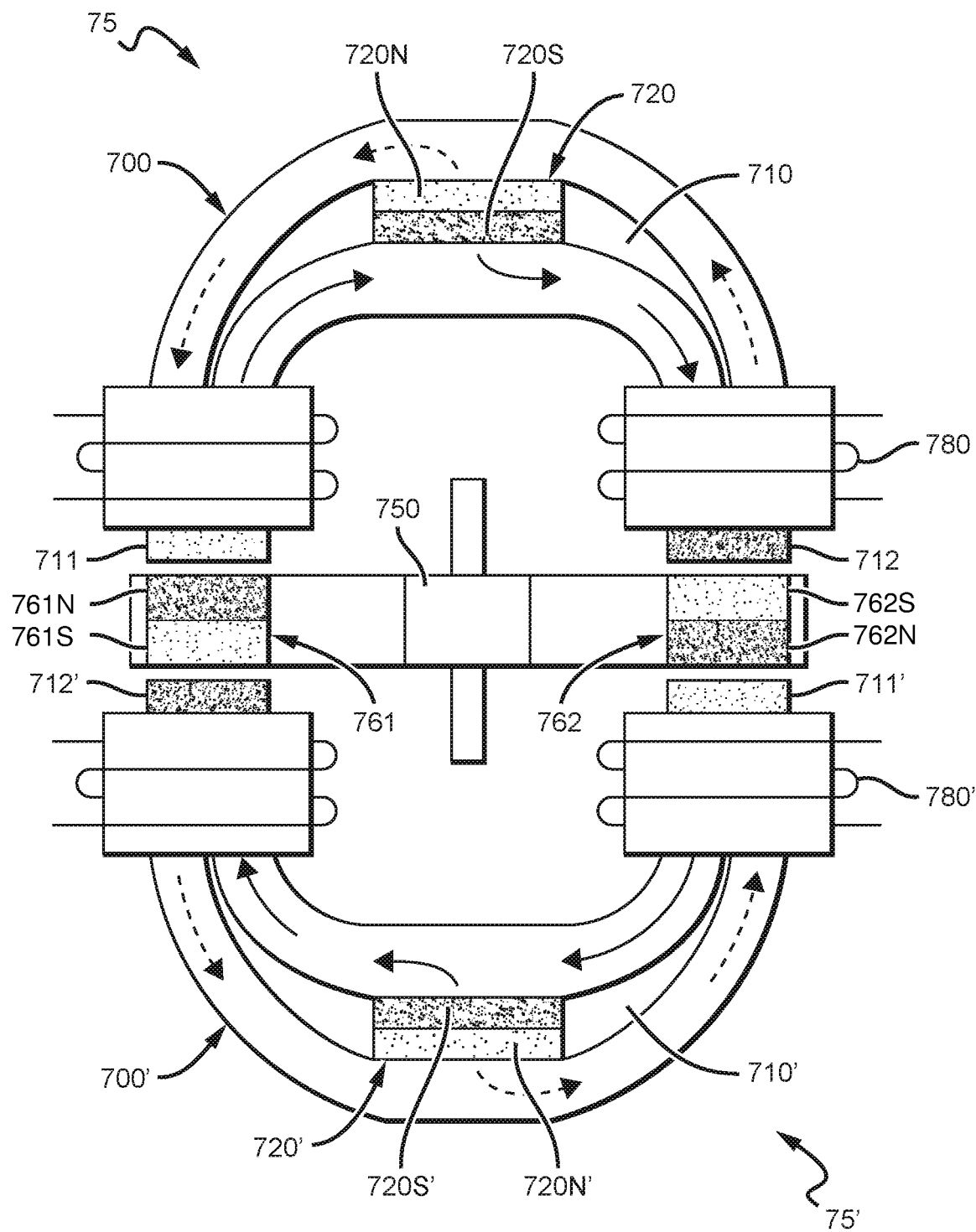
FIG. 7 is a schematic representation of a motor, wherein the stator comprises the polarity-switching magnetic diode of FIGS. 6B and 6C.

FIG. 7 shows an axial motor that employs polarity-switching magnetic diodes 75 and 75' as stators. Each polarity-switching magnetic diode has the same configuration as the embodiment shown in FIGS. 6A-C, and like numerals apply to like elements. In preferred embodiments, elements 761 and 762 could be non-magnetized ferrous elements, and polarity-switching magnetic diodes 70 and 70' could cause rotor 750 to spin by attracting ferrous rotor sections, such as attracting ferrous segments 761 and 762. In such embodiments, the polarity shown in FIG. 7 merely represents a temporary polarity effected in ferrous segments 761 and 762 when control coils 780 and 780' are switched on. In other embodiments, elements 761 and 762 could be permanent magnets, or could even be polarity-switching diodes themselves, causing rotor 750 to spin by alternately attracting and repelling through the magnetic path represented by 761 and 762. First effective poles 711 and 711' attract south poles 761S and 762S, respectively. Second effective poles 712 and 712' attract north poles 762N and 761N, respectively.

It should be appreciated that momentarily switching off the power in control coils 780 and 780', prevents attractive forces from stopping the rotation of rotor 750 in embodiments where ferrous segments 761 and 762 are permanent magnets. Reversal of the current in the control coils allow both attraction and repulsion forces to be utilized simultaneously.

In embodiments where ferrous elements 761 and 762 are not permanent magnets, switching off the power to the coil will sever the connection to the rotor, allowing the rotor to free wheel past the sticking point. Such ferrous elements 761 and 762 will have a brief induced polarity, as shown in the figure, as it aligns to register with one of the effective poles. Ferrous element 762 is shown polarized but its polarity is induced only as it aligns to register whereas a permanent magnet would induce its own magnetic field into the bore of the stator coil as it approached proximity to that stator pole. That would waste valuable energy in the form of both electric and magnetic back-EMF in the windings of the control coil and the pole of the ferrous element. That is fine for some applications but is not always preferable. By using a ferrous element or magnetic diode instead of a permanent magnet and a tight gap high torque can be achieved without inducing any unnecessary back EMF in the windings of the control coil 750. In preferred embodiments, ferrous elements 761 and 762 are, themselves, magnetic diodes capable of having their polarities reversed or turned off completely as needed.

As in previous embodiments, control coils 780 and 780' may be wired as a single control coil or multiple control coils.

Figure 8:
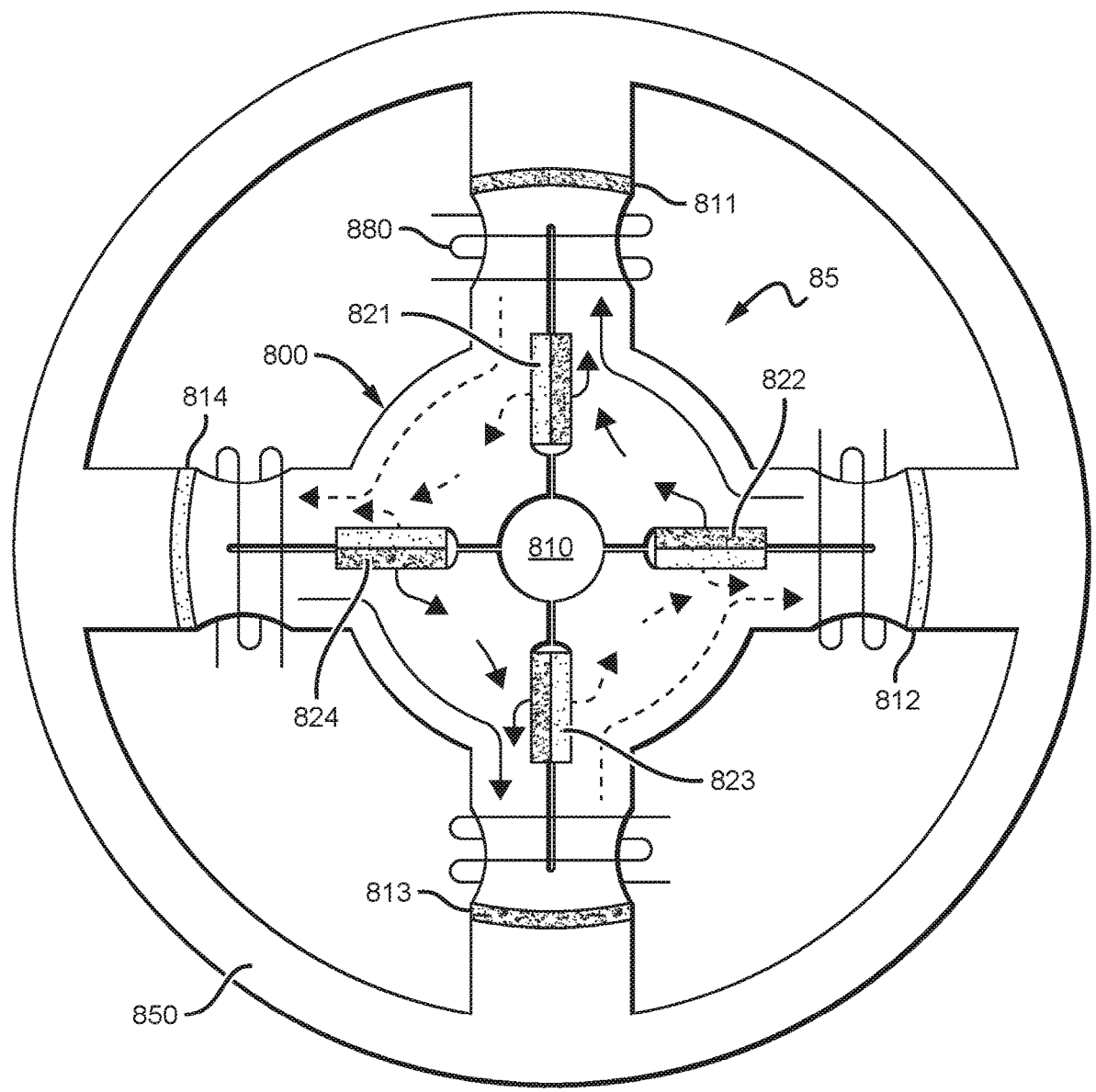
FIG. 8 is a schematic representation of an outrunner motor having a stator that is a polarity-switching magnetic diode.

FIG. 8 shows an outrunner motor that employs polarity-switching magnetic diode 85 as a stator. Magnetic flux element 800 has effective poles 811, 812, 813, and 814. Permanent magnets 821, 822, 823, and 824 are disposed in gap 810 and are magnetically coupled to magnetic flux element 800. Control coil(s) 880 wrap at least partially around gap 810 proximate to effective poles 811, 812, 813, and 814. When control coil 880 is in a first active magnetic state, magnetic north flux is directed from the north poles of permanent magnets 821 and 824 toward effective pole 814, and magnetic south flux is directed from the south poles of permanent magnets 821 and 822 towards effective pole 811. Magnetic north flux is also directed from the north poles of permanent magnets 822 and 823 toward effective pole 812, and magnetic south flux is directed from the south poles of permanent magnets 823 and 824 towards effective pole 813. Controlling the polarity of effective poles 811, 812, 813, and 814 causes rotor 850 to rotate.

Ideally rotor 850 (or any of the other rotors in the exemplary embodiments) will have 8 or some other multiple of 4 poles for a 4 diode inner stator having 4 effective poles. The rotor shown is shown euphemistically to represent an external rotor concept. In like fashion the number of poles on the inner stator can be increased to any even number of effective poles, generally limited by the diameter of the stator and rotor. The rotor can also have permanent magnets or diodes at the salient poles. Both in runner and out runner types can have any even number of diodes and effective poles sharing the same single flux circuit formed by the ferrous member.

Figure 9:
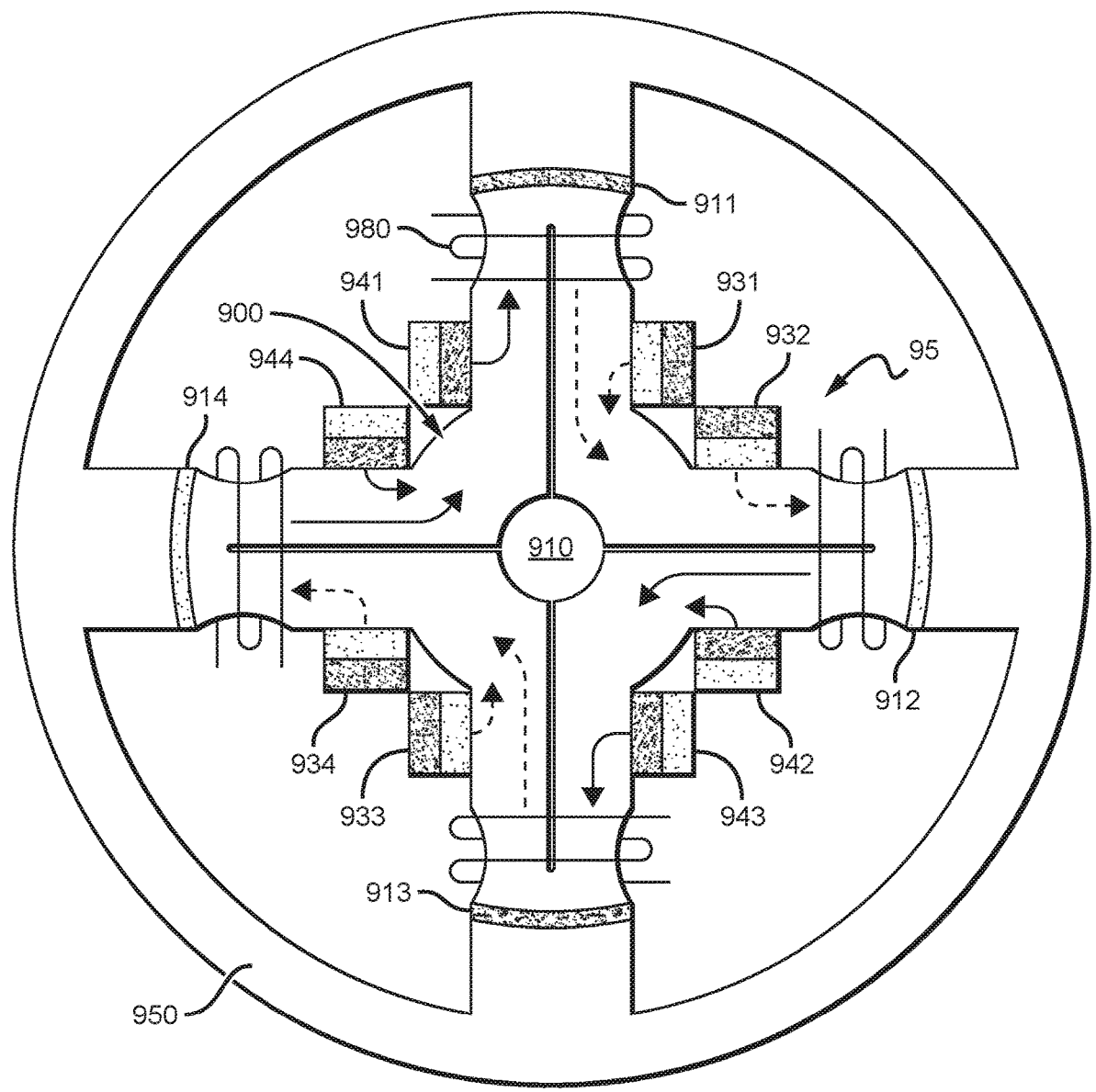
FIG. 9 shows another outrunner motor having an alternative polarity-switching magnetic diode stator.

Another embodiment of an outrunner motor is shown in FIG. 9. Stator 95 comprises a magnetic flux element 900 having gap 910. Permanent magnets 931, 932, 933, and 934 are magnetically coupled to magnetic flux element 900 via their magnetic north poles. Permanent magnets 941, 942, 943, and 944 are magnetically coupled to magnetic flux element 900 via their magnetic south poles. Gap 910 extends at least partially into control coil(s) 980. In the active magnetic state illustrated in FIG. 9, control coil 980 directs magnetic north flux from permanent magnets 931 and 932 toward effective pole 912 and from permanent magnets 933 and 934 toward effective pole 914. Control coil 980 also directs magnetic south flux from permanent magnets 941 and 944 toward effective pole 911 and from permanent magnets 942 and 943 toward effective pole 913. Interaction between the magnetic flux from effective poles 911-914 and magnetic elements in rotor 950 cause rotor 950 to rotate.

Figure 10:
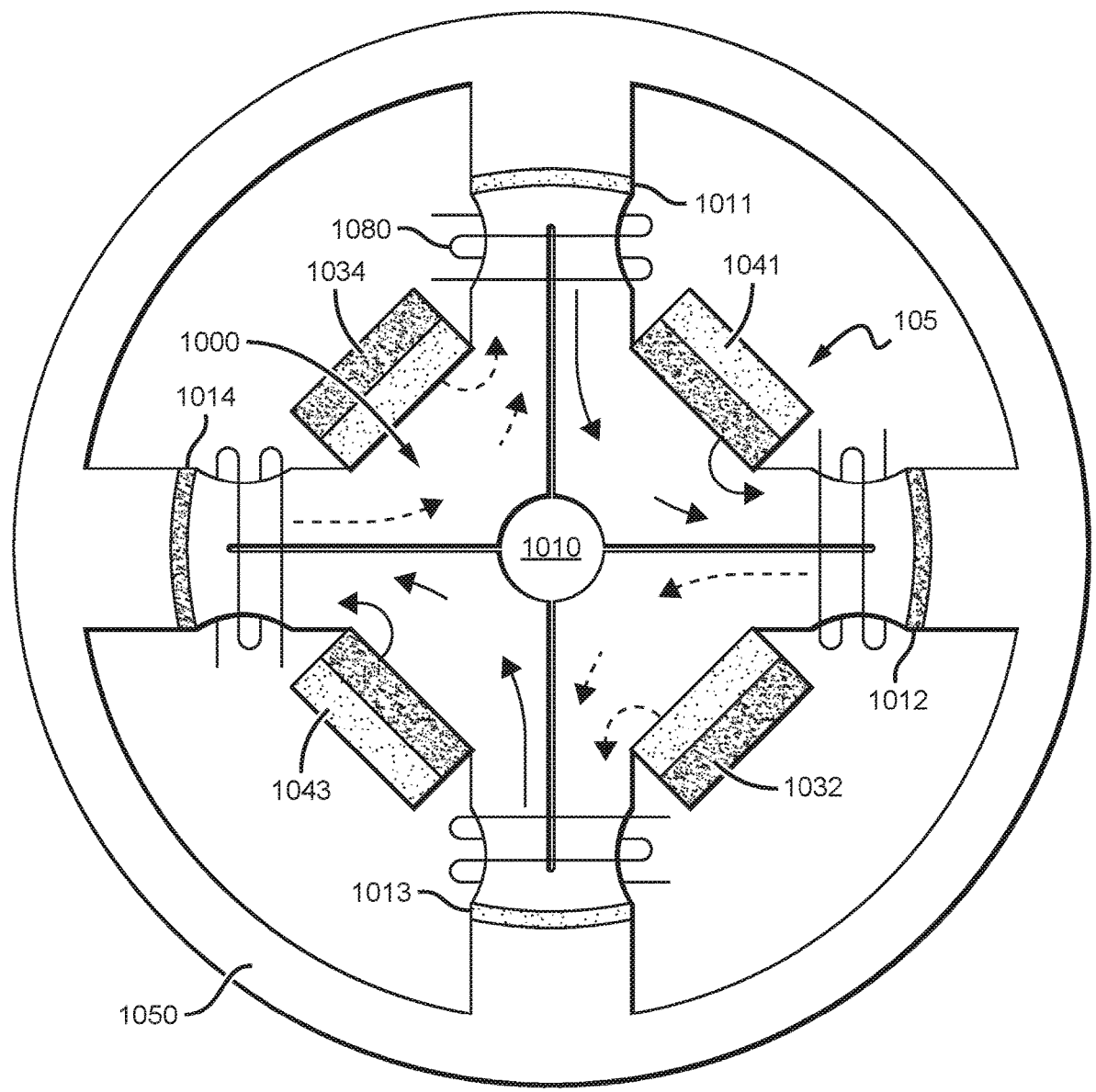
FIG. 10 shows another outrunner motor having an alternative stator that is a polarity-switching magnetic diode.

The outrunner motor shown in FIG. 10 comprises rotor 1050 and stator 105. Stator 105 comprises a polarity-switching magnetic diode having magnetic flux element 1000 with gap 1010. Permanent magnets 1032 and 1034 are magnetically coupled to magnetic flux element 1000 via their magnetic north poles—acting as magnetic north flux donors. Permanent magnets 1041 and 1043 are magnetically coupled to magnetic flux element 1000 via their magnetic south poles—acting as magnetic south flux donors. Gap 1010 extends at least partially into each control coil 1080, which directs north and south magnetic flux.

In the active magnetic state shown, each control coil 1080 directs magnetic north flux from permanent magnets 1034 and 1032 clockwise toward effective poles 1011 and 1013, respectively. In this magnetic state, each control coil 1080 also directs magnetic south flux from permanent magnets 1041 and 1043 clockwise toward effective poles 1012 and 1014, respectively. When the current in control coil 1080 is switched to an opposing magnetic state, each control coil 1080 directs the magnetic fluxes the opposite way, which will switch effective poles 1011 and 1013 to effective south poles and effective poles 1012 and 1014 to effective north poles.

Figure 11:
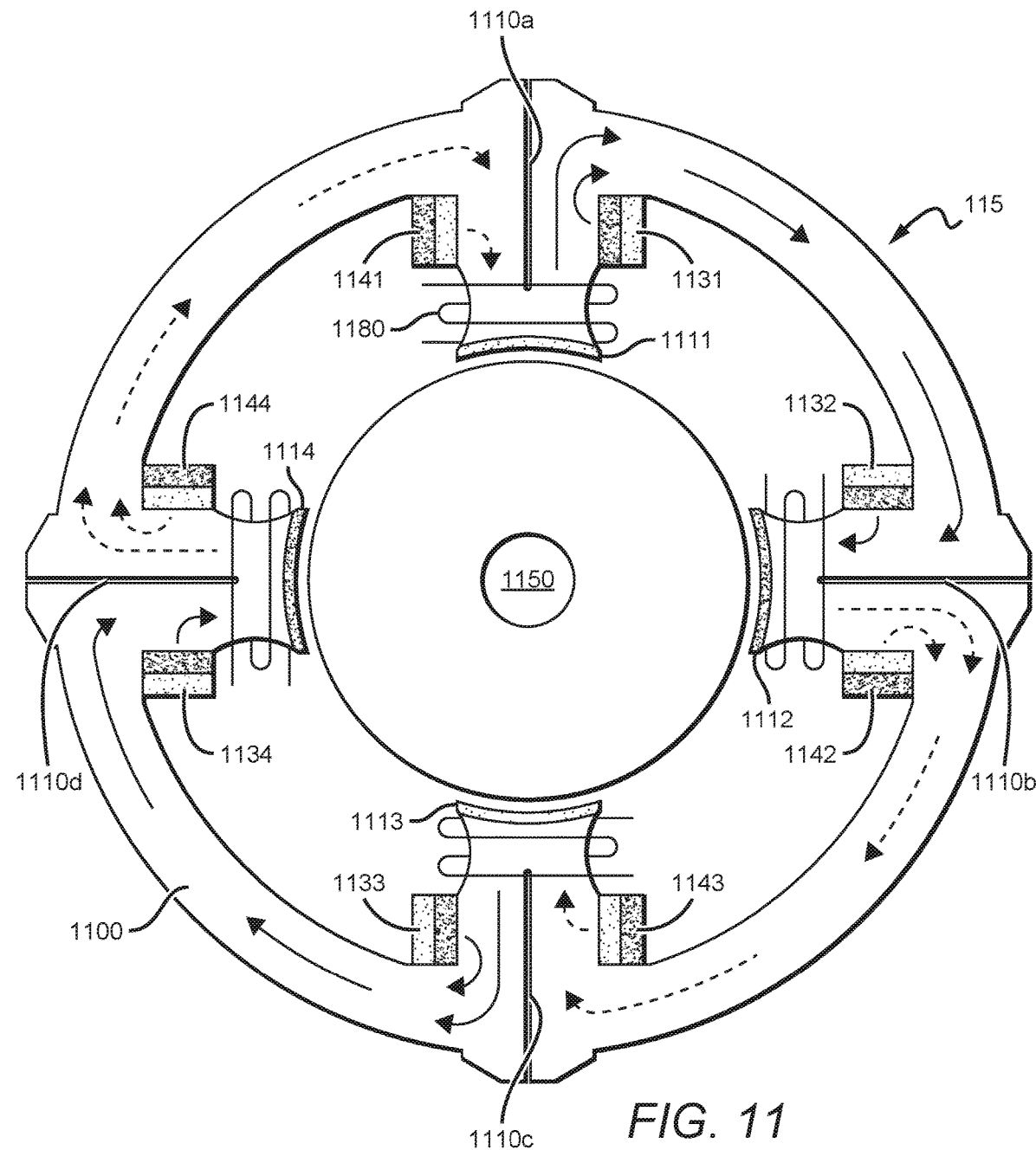
FIG. 11 is a schematic representation of an axial motor having a stator that is a polarity-switching magnetic diode.

FIG. 11 shows an alternative motor having a stator 115 and an inner rotor 1150. In this embodiment, the magnetic flux donors are magnetically coupled to magnetic flux element 1100 of stator 115, whose effective magnetic poles switch depending upon the current flow of control coil 1180. Stator 1100 has a plurality of gaps, gap 1110a, gap 1110b, gap 1110c, and gap 1110d. Each of the gaps ensure that a low reluctance path flows towards an effective pole from each of the permanent magnets 1131, 1132, 1133, 1134, 1141, 1142, 1143, and 1144. Permanent magnets 1141, 1142, 1143, and 1144 are each magnetically coupled to stator 1100 as magnetic north flux donors and permanent magnets 1131, 1132, 1133, and 1134 are each magnetically coupled to stator 1100 as magnetic south flux donors.

In the active magnetic state shown, each control coil 1180 directs magnetic north flux from permanent magnets 1141 and 1144 clockwise towards effective pole 1111, magnetic north flux from permanent magnets 1142 and 1143 clockwise towards effective pole 1113, magnetic south flux from permanent magnets 1131 and 1132 clockwise towards effective pole 1112, and magnetic south flux from permanent magnets 1133 and 1134 clockwise towards effective pole 1114. When the current in each control coil 1180 is switched, the effective poles also switch polarity as the magnetic flux runs in a counter-clockwise direction.

Figure 12:
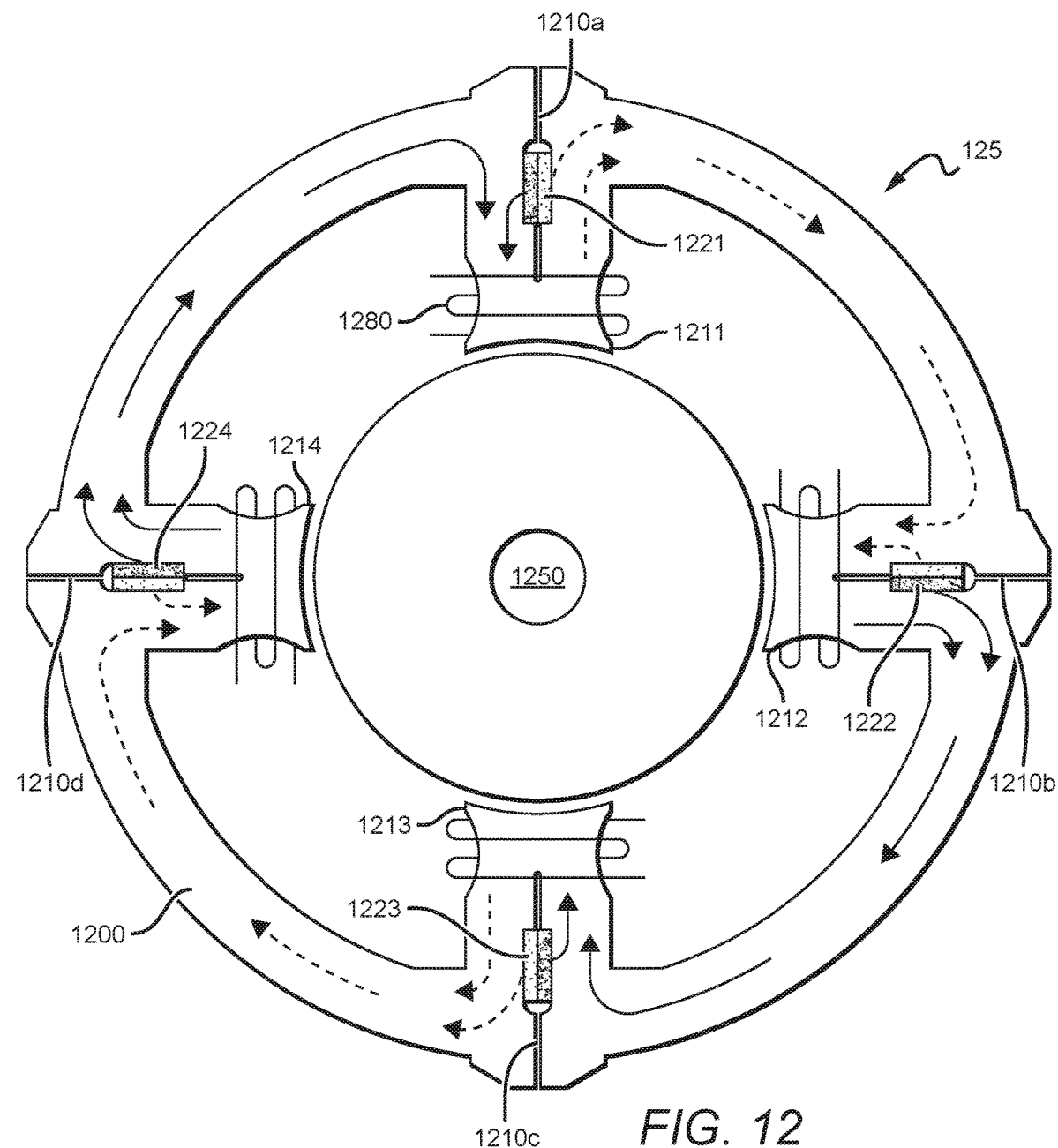
FIG. 12 shows another motor having an alternative polarity-switching magnetic diode stator.

FIG. 12 shows yet another alternative motor embodiment, where magnetic flux element 1200 of stator 125 has a plurality of gaps 1210a, 1210b, 1210c, and 1210d which each contain a permanent magnet 1221, 1222, 1223, and 1224, respectively, acting as both magnetic north flux donors and magnetic south flux donor. In the active magnetic state shown, permanent magnets 1221 and 1222 provide magnetic north flux that is directed in a clockwise direction towards effective pole 1212; permanent magnets 1223 and 1224 provide magnetic north flux that is directed in a clockwise direction towards effective pole 1214; permanent magnets 1221 and 1224 provide magnetic south flux that is directed in a clockwise direction towards effective pole 1211; and permanent magnets 1222 and 1223 provide magnetic north flux that is directed in a clockwise direction towards effective pole 1213. When the current in each control coil 1280 is reversed, the magnetic fluxes will then flow in a counter-clockwise direction, switching the effective poles.

Figure 13:
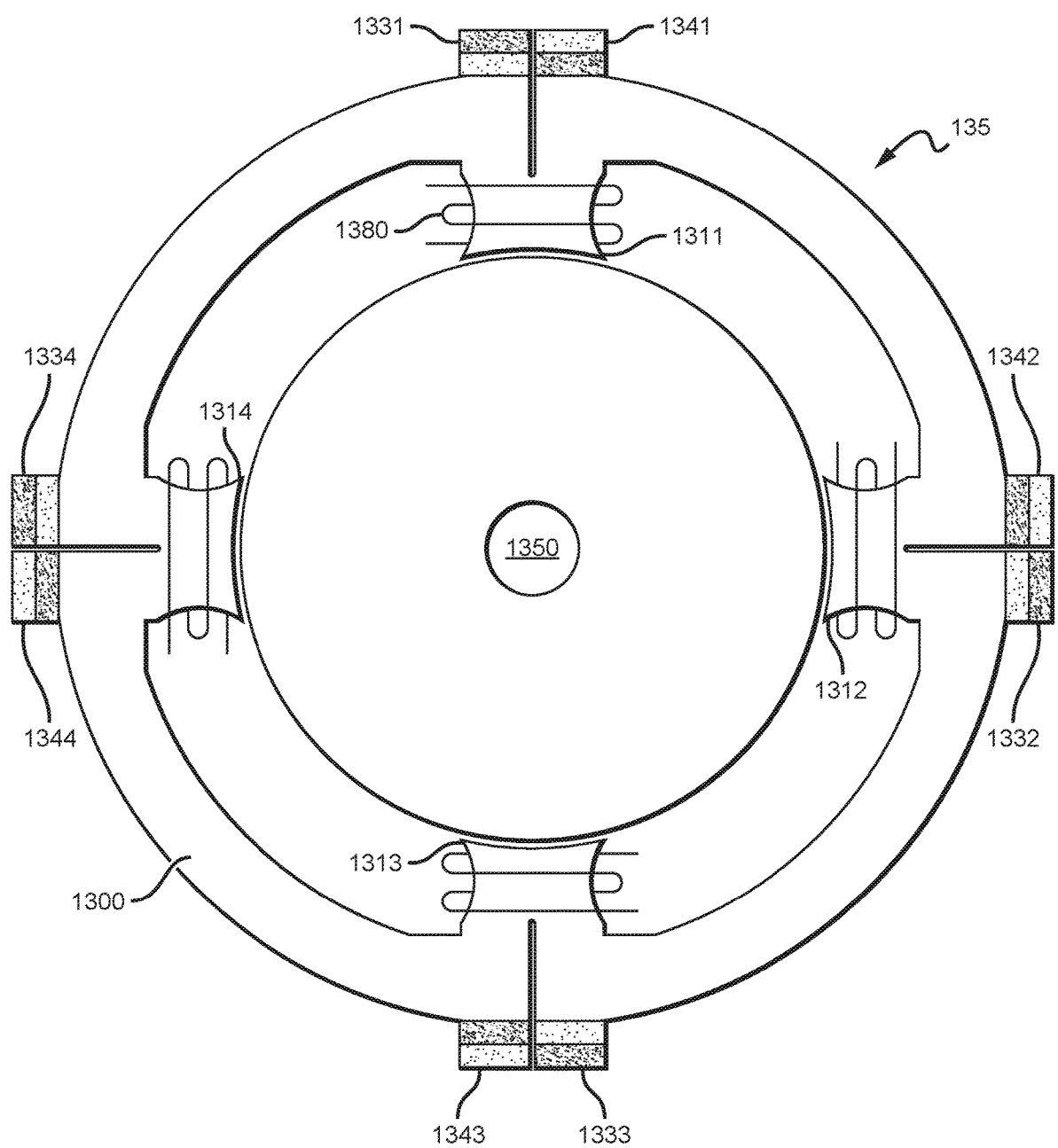
FIG. 13 shows another motor having an alternative stator that is a polarity-switching magnetic diode.

FIG. 13 shows yet another alternative motor embodiment, also with magnetic flux element 1300 of stator 135 having a plurality of gaps similar to the gaps of stator 1100, however instead of the permanent magnets magnetically coupled to either side of each effective pole 1311, 1312, 1313, and 1314, permanent magnets 1331, 1332, 1333, 1334, 1341, 1342, 1343, and 1344, are each magnetically coupled to either side of the gap to provide north and south magnetic flux. Each effective pole has a control coil 1380 that directs the magnetic flux clockwise in a first active magnetic state and counter-clockwise in a second magnetic state.

Figure 16:
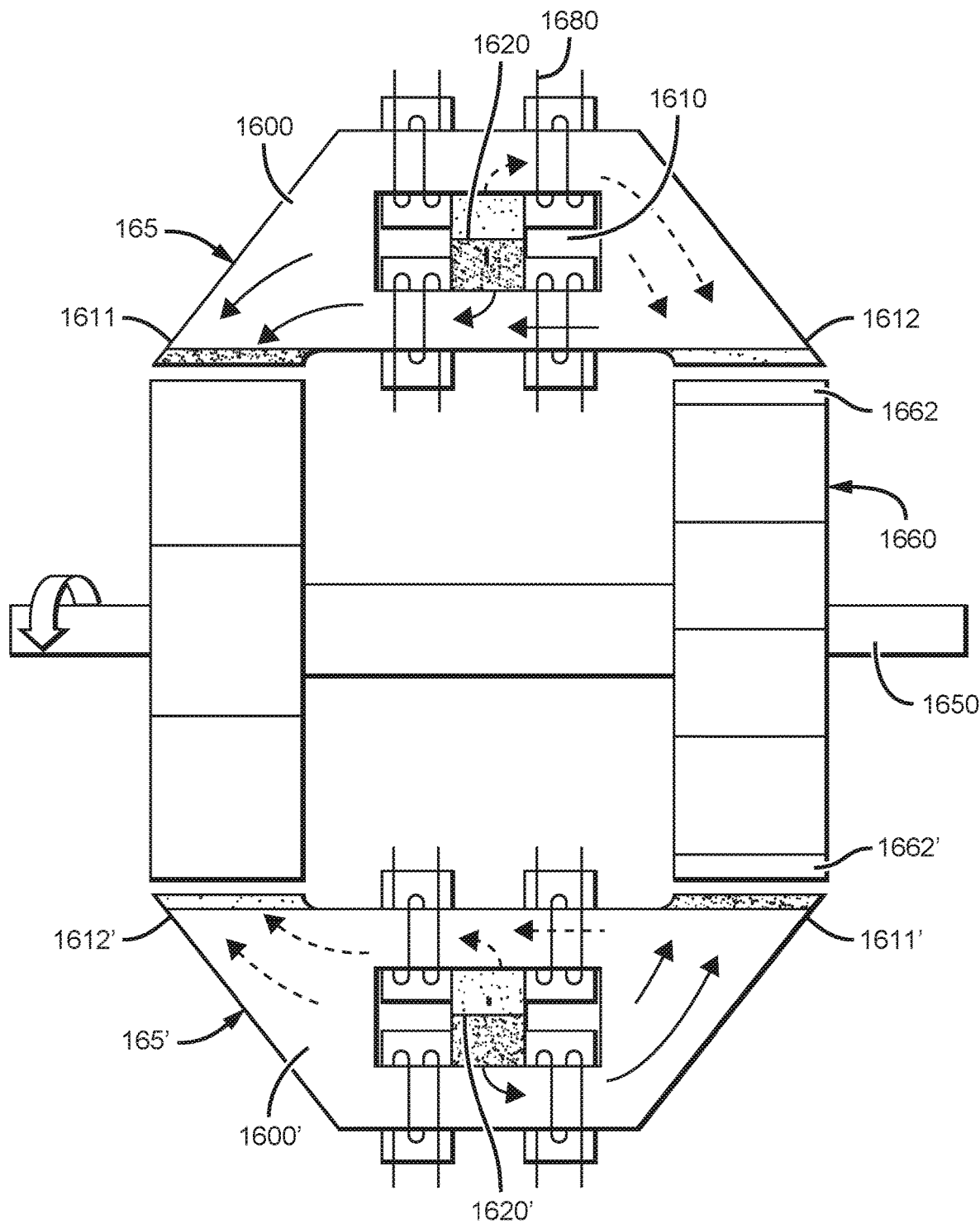
FIG. 16 shows another configuration for a motor having a stator that is a polarity-switching magnetic diode.

The alternative motor embodiments in FIGS. 12, 13 and 16 illustrate that so long as magnetic flux donors are magnetically coupled to any portion of the perimeter of the stator, even coupled within the gap, the magnetic flux can be directed using a control coil wrapped around a portion of the low reluctance path formed by the magnetic flux element material of the stator itself.

Figure 14:
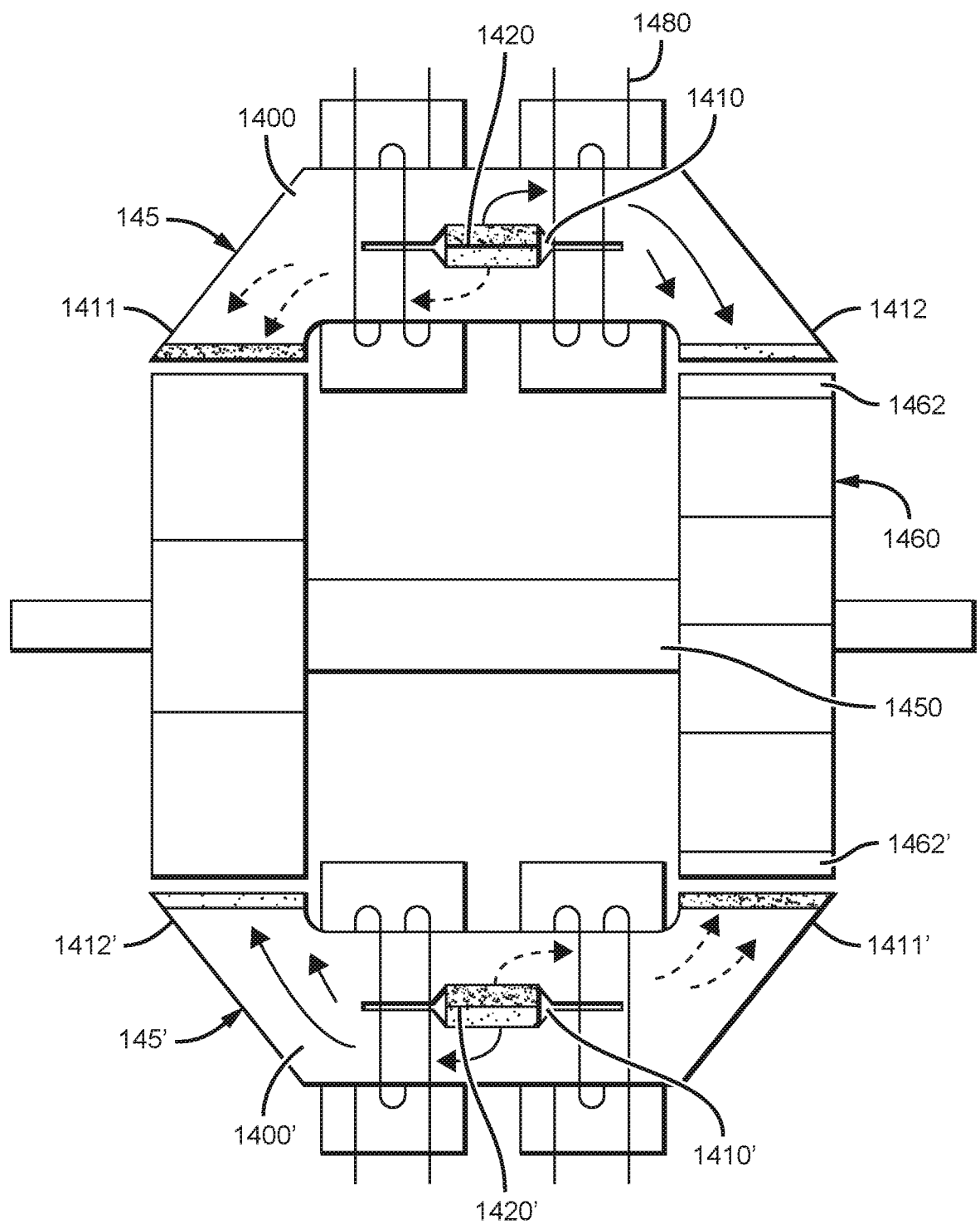
FIG. 14 shows another configuration for a motor having a stator with a polarity-switching magnetic diode.

FIG. 14 shows an alternative motor having a shaft 1450 and rotor 1460 surrounded on either side by stators 145 and 145', each configured as a polarity-switching diode. Magnetic flux element 1400 has gap 1410 that has permanent magnet 1420 coupled to two interior surfaces of gap 1410 to provide both magnetic north flux and magnetic south flux—similar to magnetic flux element 1400 of FIG. 4. However, here control coil 1480 wraps around both side of permanent magnet 1420. In some embodiments, control coil 1480 only wraps around one side of permanent magnet 1420. In the active state shown, control coil 1480 directs magnetic north flux clockwise towards effective pole 1411 and magnetic south flux clockwise towards effective pole 1412. When the current for control coil 1480 is reversed, the magnetic flux flow will also reverse. Magnetic flux element 1400' is similar to magnetic flux element 1400, having gap 1410', permanent magnet 1420', and effective poles 1411' and 1412'.

Figure 15:
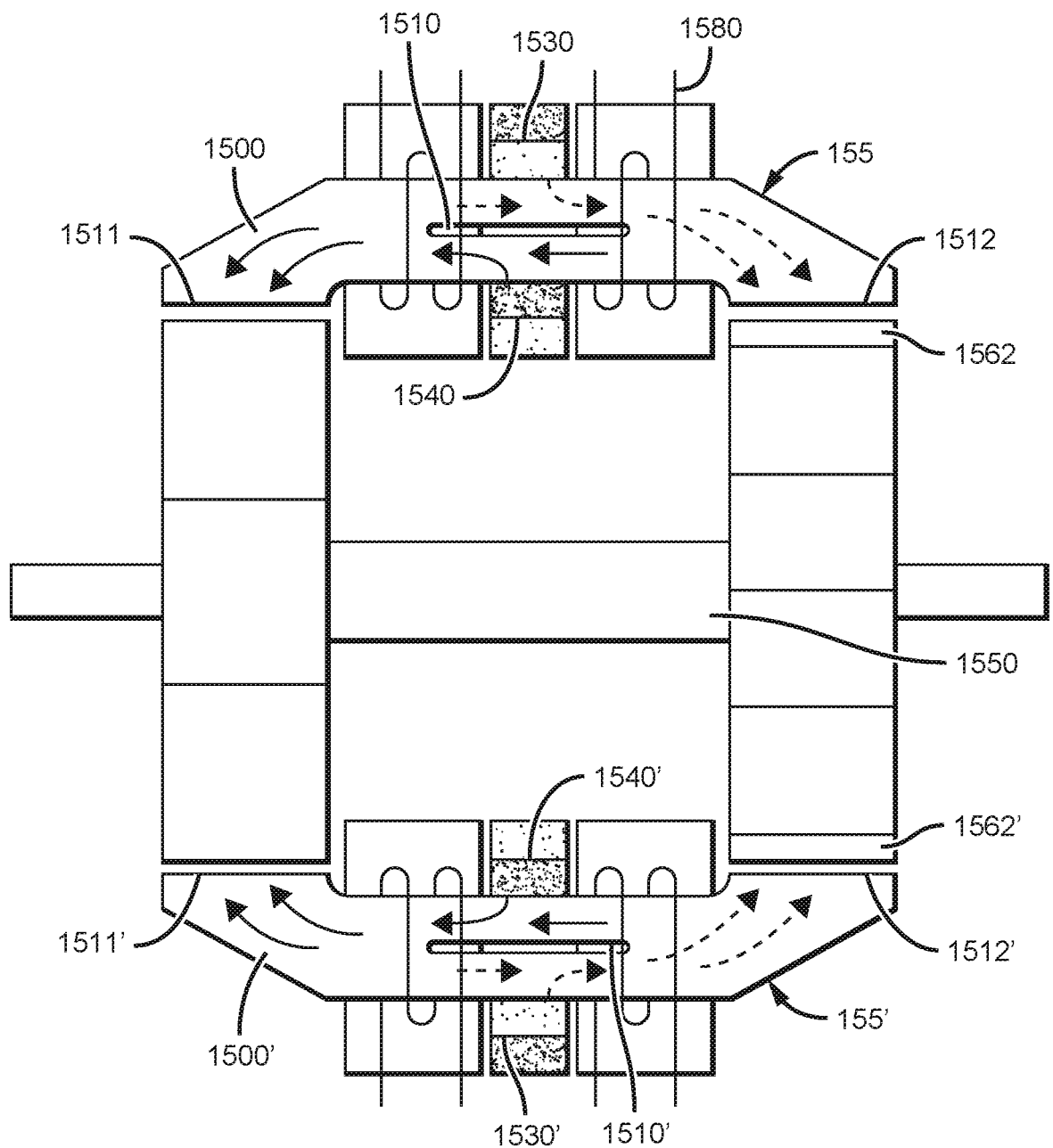
FIG. 15 shows another configuration for a motor having a stator that is a polarity-switching magnetic diode according to the inventive subject matter.

The motor shown in FIG. 15 has a shaft 1550 and rotor 1560 surrounded on either side by stators 155 and 155', each configured as a polarity-switching diode. Magnetic flux element 1500 has gap 1510. Permanent magnets 1530 and 1540 are coupled to magnetic flux element 1500 to provide magnetic north flux and magnetic south flux, respectively. Control coil 1580 wraps around magnetic flux element 1500 and at least a portion of gap 1510 on either side of permanent magnets 1530 and 1540. In the active state shown, control coil 1580 directs magnetic north flux clockwise towards effective pole 1512 and magnetic south flux counterclockwise towards effective pole 1511. When the current for control coil 1580 is reversed, the magnetic flux flow will also reverse. Magnetic flux element 1500' is similar to magnetic flux element 1500, having gap 1510', permanent magnets 1530' and 1540', and effective poles 1511' and 1512'.

FIG. 16 shows an alternative motor having a shaft 1650 and rotor 1660 surrounded on either side by stators 165 and 165', each configured to embody the properties of a polarity-switching diode. Magnetic flux element 1600 has gap 1610 that has permanent magnet 1620 coupled to two interior surfaces of gap 1610 to provide both magnetic north flux and magnetic south flux. In the active magnetic state shown, control coil 1680 directs magnetic north flux from permanent magnet 1620 towards effective pole 1612 and magnetic south flux from permanent magnet 1620 towards effective pole 1611. Magnetic flux element 1600' is similar to magnetic flux element 1600, having gap 1610', permanent magnet 1620', and effective poles 1611' and 1612'.

The alternative magnetic flux diode configuration in FIG. 16 illustrates that control coil 1680 need not necessarily be wrapped around an effective pole to direct magnetic flux, and can direct magnetic flux by being wrapped through the gap instead of around the entire flux path to direct magnetic flux in one direction or another.

Figure 17:
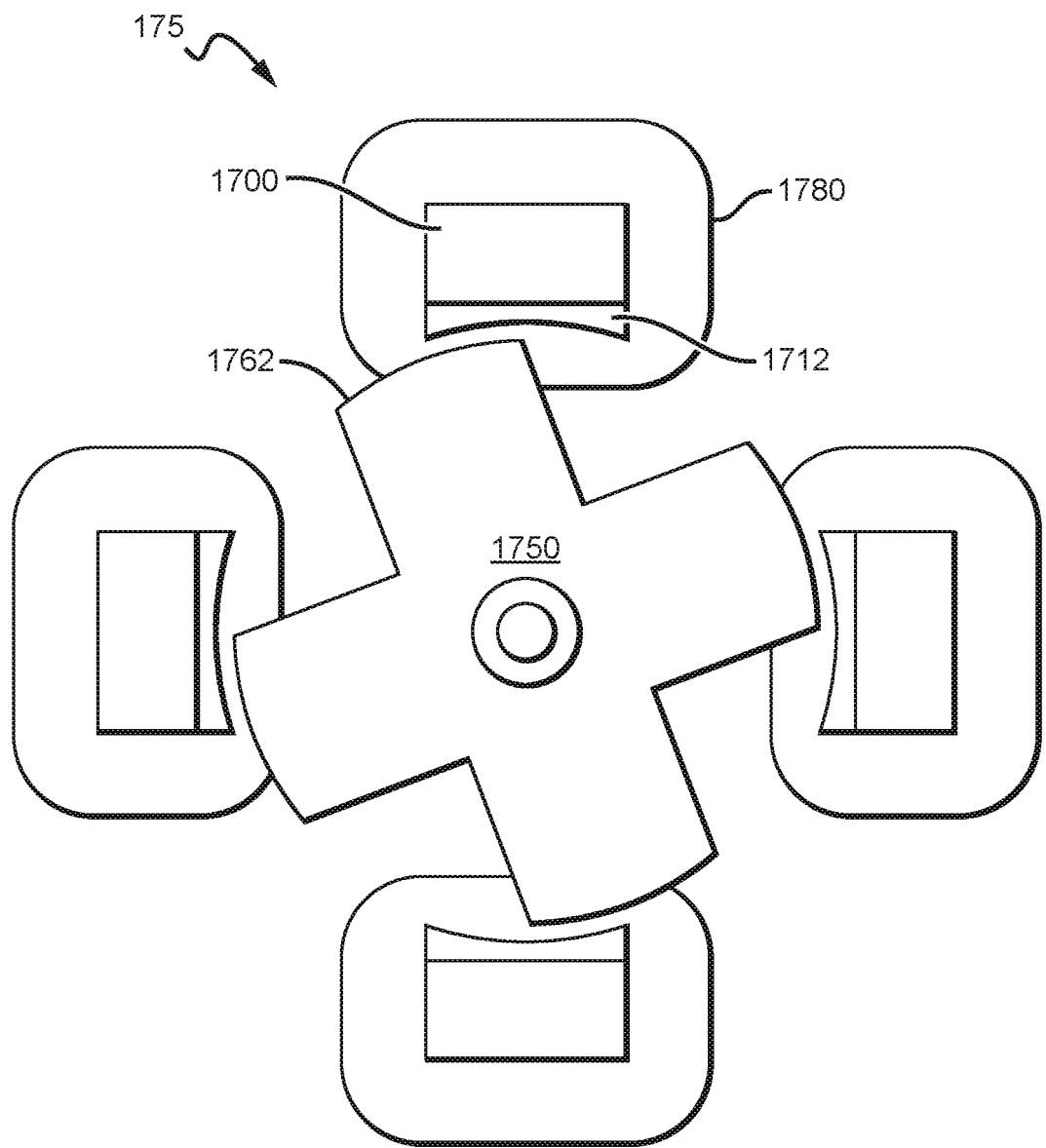
FIG. 17 shows a side view of the embodiments of FIGS. 14-16.

A side view of the embodiments shown in FIGS. 14-16 is shown in FIG. 17. Control coil 1780 and effective poles 1712 are visible in the side view of stators 175. Rotor 1762 and shaft 1750 are also visible.

One should appreciate that the disclosed techniques provide many advantageous technical effects including the ability to switch the polarity of the electromagnet having permanent magnets being used to enhance both poles. Gaps in the core of the electromagnet used in conjunction with a power control coil to enhance magnetic flux at each pole with magnetic flux from permanent magnets. The rotor configurations that can be used with a polarity-switching magnetic diode and the stator motors shown in FIGS. 14-26 are many. One preferred embodiment pairs an exemplary stator with an exemplary rotor, such as those shown in FIGS. 8-10. In such embodiments, the inner multi-pole diode based rotor can be powered via brushes coupled to a power source.

A switchable polarity magnetic diode utilizes the flux of a permanent magnet to do work while electricity consumed by the device can be minimized to only to the amount of energy needed to control/direct the flux supplied by the permanent magnet towards the effective poles. The unique method of controlling flux allows both the coil induced flux and the permanent magnet flux to always work together in such a way that total lines of magnetic flux at the working surface of the pole face can be double (200%) compared to either of the permanent magnets or control coil flux singly. This provides for excellent economy of operation in any magnetic application requiring high "permanent-magnet-like" holding/pulling power per amp turn. Such diodes could also be used for applications that use "on-off switching" for creating pulsed magnetic fields of same or alternating polarity, and is especially applicable towards "reversible polarity-switching" applications for creating high density or alternating N/S polarity magnetic fields.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A polarity-switching magnetic diode comprising:
    a first non-magnetized ferrous element magnetically coupled to a magnetic flux element;
    a second non-magnetized ferrous element magnetically coupled to the magnetic flux element;
    wherein the magnetic flux element comprises a first effective pole, a second effective pole, and a first gap; and
    a control coil wrapped around a portion of the magnetic flux element such that the first gap extends at least partially into the control coil, wherein the control coil has a first active magnetic state and a second active magnetic state,
    wherein the first active magnetic state directs a north temporary polarity from the first non-magnetized ferrous element along the magnetic flux element towards the first effective pole and directs a south temporary polarity from the second non-magnetized ferrous element along the magnetic flux element towards the second effective pole; and
    wherein the second active magnetic state directs the north temporary polarity from the first non-magnetized ferrous element along the magnetic flux element towards the second effective pole and directs the south temporary polarity from the second non-magnetized ferrous element along the magnetic flux element towards the first effective pole.

2. The polarity-switching magnetic diode of claim 1, further comprising:
    a third non-magnetized ferrous element magnetically coupled to the magnetic flux element; and
    a fourth non-magnetized ferrous element magnetically coupled to the magnetic flux element, and
    wherein the first active magnetic state also directs the north temporary polarity from the third non-magnetized ferrous element to the first effective pole, and directs the south temporary polarity from the fourth non-magnetized ferrous element to the second effective pole.

3. The polarity-switching magnetic diode of claim 2, wherein the magnetic flux element comprises a plurality of parallel layers separated by gaps.

4. The polarity-switching magnetic diode of claim 2, wherein the magnetic flux element comprises a second gap that extends at least partially into the control coil, and wherein the first and second non-magnetized ferrous elements are disposed in the first and second gaps, respectively.

5. The polarity-switching magnetic diode of claim 1, wherein the magnetic flux element is substantially straight.

6. The polarity-switching magnetic diode of claim 1, wherein the magnetic flux element is substantially curved.

7. The polarity-switching magnetic diode of claim 1, wherein the control coil is positioned proximate to at least one of the first effective pole and the second effective pole.

8. The polarity-switching magnetic diode of claim 1, wherein the control coil is wrapped around the magnetic flux element along a magnetic flux path between the first magnetic north flux donor and at least one of the first and second effective poles.

9. The polarity-switching magnetic diode of claim 1, further comprising a switch that reverses a current passing through the control coil, wherein the switch flips the control coil from the first active magnetic state to the second active magnetic state.

* * * * *